US012680716B2

(12) United States Patent
Wei et al.

(10) Patent No.: US 12,680,716 B2
(45) Date of Patent: Jul. 14, 2026

(54) REGISTRATION SYSTEM, AIR CONDITIONING SYSTEM AND REGISTRATION PROGRAM

(71) Applicant: DAIKIN INDUSTRIES, LTD., Osaka (JP)

(72) Inventors: Yaguang Wei, Osaka (JP); Yuichi Murai, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 422 days.

(21) Appl. No.: 18/550,014

(22) PCT Filed: Mar. 31, 2022

(86) PCT No.: PCT/JP2022/016825
§ 371 (c)(1),
(2) Date: Sep. 11, 2023

(87) PCT Pub. No.: WO2022/211083
PCT Pub. Date: Oct. 6, 2022

(65) Prior Publication Data
US 2024/0175597 A1 May 30, 2024

(30) Foreign Application Priority Data

Mar. 31, 2021 (JP) ................................. 2021-059231

(51) Int. Cl.
*F24F 11/63* (2018.01)
*F24F 11/52* (2018.01)
(Continued)

(52) U.S. Cl.
CPC .............. *F24F 11/63* (2018.01); *F24F 11/52* (2018.01); *G06V 20/52* (2022.01); *F24F 2120/10* (2018.01)

(58) Field of Classification Search
CPC ........ F24F 11/63; F24F 11/52; F24F 2120/10; F24F 11/50; F24F 11/526; F24F 11/54;
(Continued)

(56) References Cited

U.S. PATENT DOCUMENTS

2011/0078238 A1 3/2011 Sakka
2012/0327080 A1 12/2012 Arakita et al.
(Continued)

FOREIGN PATENT DOCUMENTS

JP 2002-099971 4/2002
JP 2009-020007 1/2009
(Continued)

OTHER PUBLICATIONS

International Search Report for PCT/JP2022/016825 mailed on Jun. 7, 2022.
(Continued)

*Primary Examiner* — Alicia M. Choi
(74) *Attorney, Agent, or Firm* — IPUSA, PLLC

(57) ABSTRACT

Provided are a registration system, an air conditioning system, and a registration program that register a specific area to be controlled in a real space. The registration system includes a control unit and a storage unit. The control unit is configured to determine a specific area in a real space based on position information of a user terminal in the real space and based on operation contents of the user terminal, and register the specific area in the storage unit.

22 Claims, 29 Drawing Sheets

(51) Int. Cl.
   *G06V 20/52* (2022.01)
   *F24F 120/10* (2018.01)

(58) Field of Classification Search
   CPC .. F24F 11/56; F24F 11/79; F24F 11/30; F24F
   11/64; F24F 11/89; G06V 20/52; G06F
   3/04847; G06F 1/1686; G06F 1/1694;
   G06F 3/0304; G06F 3/04815; G08C
   17/02; H04M 1/72415
   See application file for complete search history.

(56) References Cited

U.S. PATENT DOCUMENTS

| | | | |
|---|---|---|---|
| 2014/0333211 A1 | 11/2014 | Oka et al. | |
| 2017/0205891 A1* | 7/2017 | Mason | G06F 3/0304 |
| 2017/0256099 A1* | 9/2017 | Li | G06T 13/20 |
| 2017/0316575 A1 | 11/2017 | Adachi | |
| 2017/0359697 A1* | 12/2017 | Bhatti | G01S 5/14 |
| 2018/0086179 A1 | 3/2018 | Mizuno et al. | |
| 2018/0102914 A1 | 4/2018 | Kawachi et al. | |
| 2018/0120793 A1* | 5/2018 | Tiwari | G06Q 10/04 |
| 2019/0266887 A1* | 8/2019 | Sugaya | G06F 1/1686 |
| 2020/0413217 A1* | 12/2020 | Rothschild | H04W 4/026 |

FOREIGN PATENT DOCUMENTS

| | | | | |
|---|---|---|---|---|
| JP | 2010-154124 | | | 7/2010 |
| JP | 2011-076335 | | | 4/2011 |
| JP | 2012-141104 | | | 7/2012 |
| JP | 2012141104 | A | * | 7/2012 |
| JP | 2012-257119 | | | 12/2012 |
| JP | 2013-008324 | | | 1/2013 |
| JP | 2013-246589 | | | 12/2013 |
| JP | 2016-080602 | | | 5/2016 |
| JP | 2016-196287 | | | 11/2016 |
| JP | 2017-201745 | | | 11/2017 |
| JP | 2017-211149 | | | 11/2017 |
| JP | 2018-063537 | | | 4/2018 |
| JP | 2020-085302 | | | 6/2020 |
| JP | 2020-089565 | | | 6/2020 |
| JP | 2020085302 | A | * | 6/2020 |
| WO | 2013/099629 | | | 7/2013 |
| WO | 2016/129085 | | | 8/2016 |
| WO | 2020/194777 | | | 10/2020 |

OTHER PUBLICATIONS

Journal of the Robotics Society of Japan, vol. 31 No. 9, pp. 896~906, Nov. 2013 "Global Localization for Mobile Robot using Large-scale 3D Environmental Map and RGB-D Camera" Jeong Yongjin, Ryo Kurazume, Yumi Iwashita, and Tsutomu Hasegawa.

Extended European Search Report for 22781292.2 dated Feb. 25, 2025.

International Preliminary Report on Patentability for PCT/JP2022/016825 mailed on Oct. 12, 2023.

* cited by examiner

FIG.1
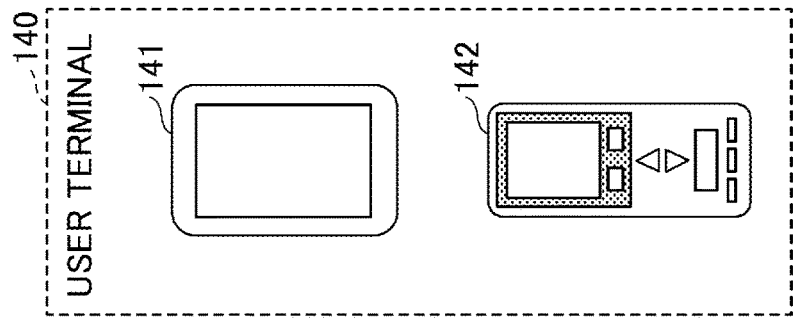
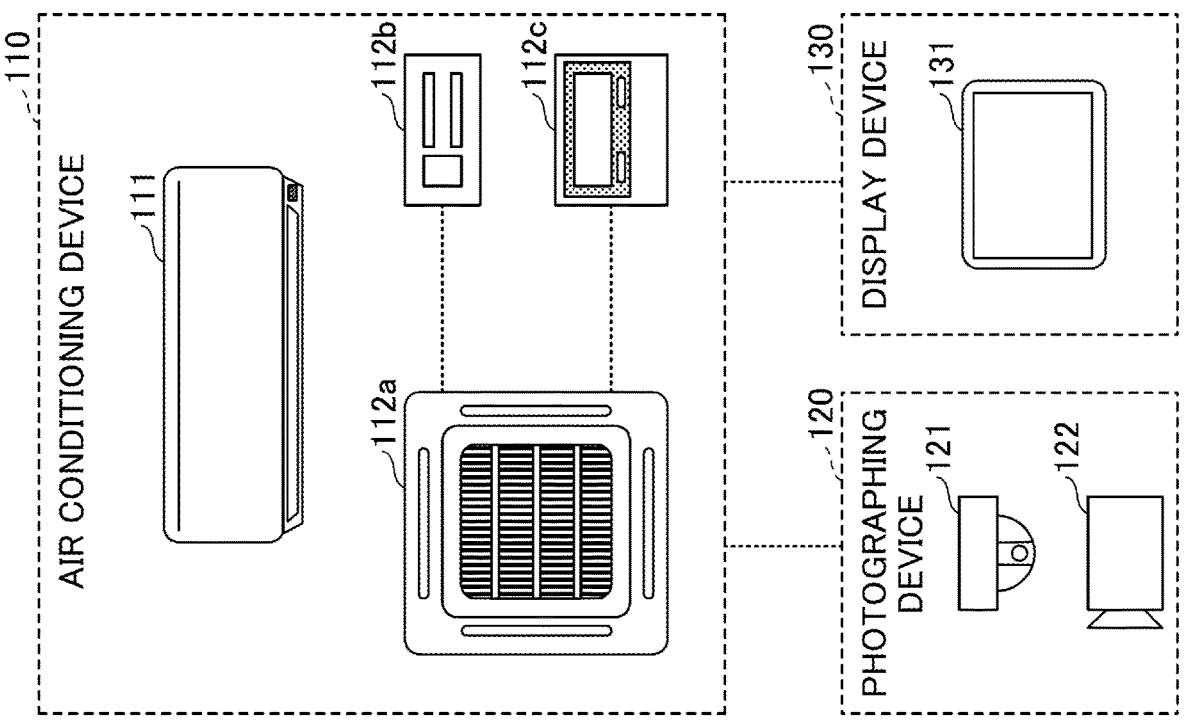

FIG.3

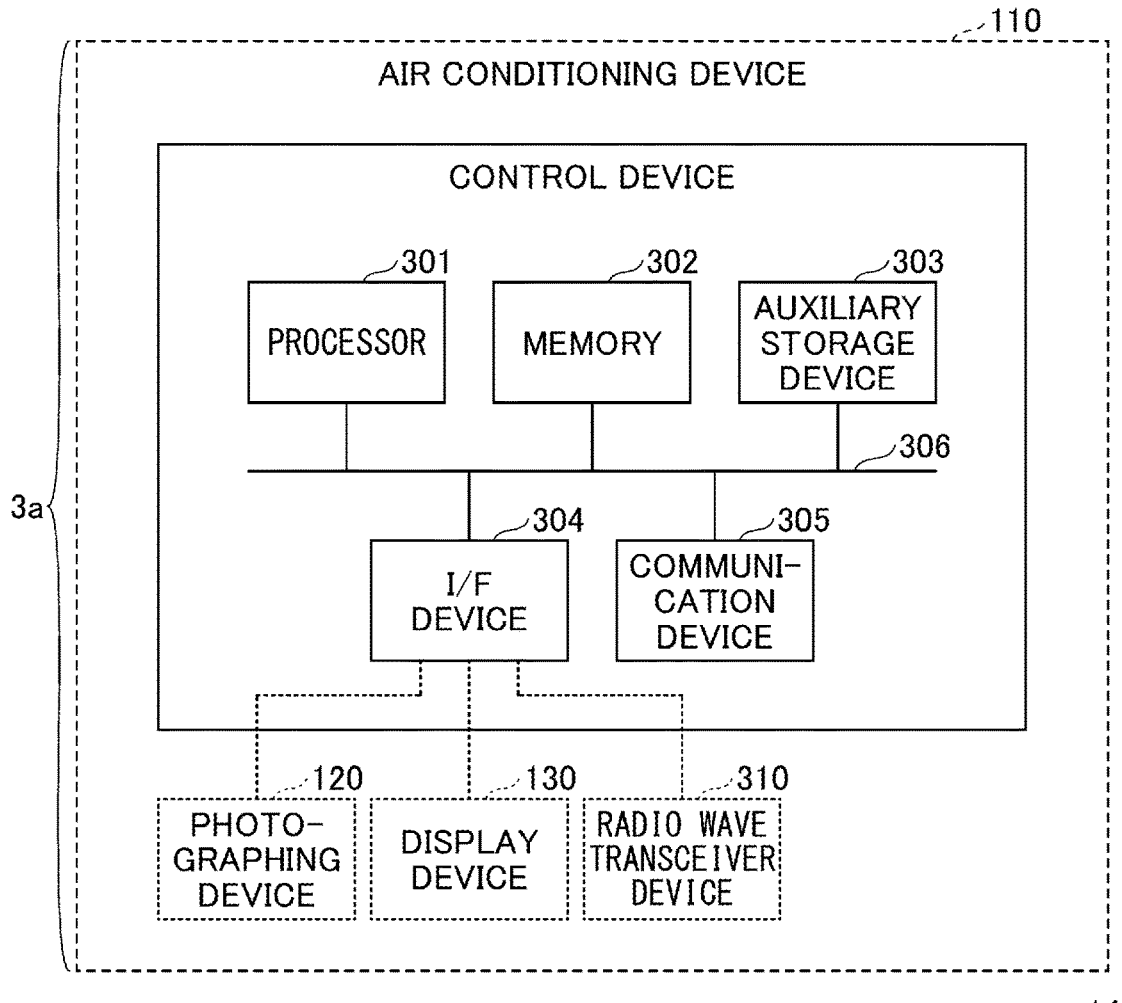

110

AIR CONDITIONING DEVICE

CONTROL DEVICE

301 — PROCESSOR

302 — MEMORY

303 — AUXILIARY STORAGE DEVICE

306

304 — I/F DEVICE

305 — COMMUNI-CATION DEVICE

3a

120 — PHOTO-GRAPHING DEVICE

130 — DISPLAY DEVICE

310 — RADIO WAVE TRANSCEIVER DEVICE

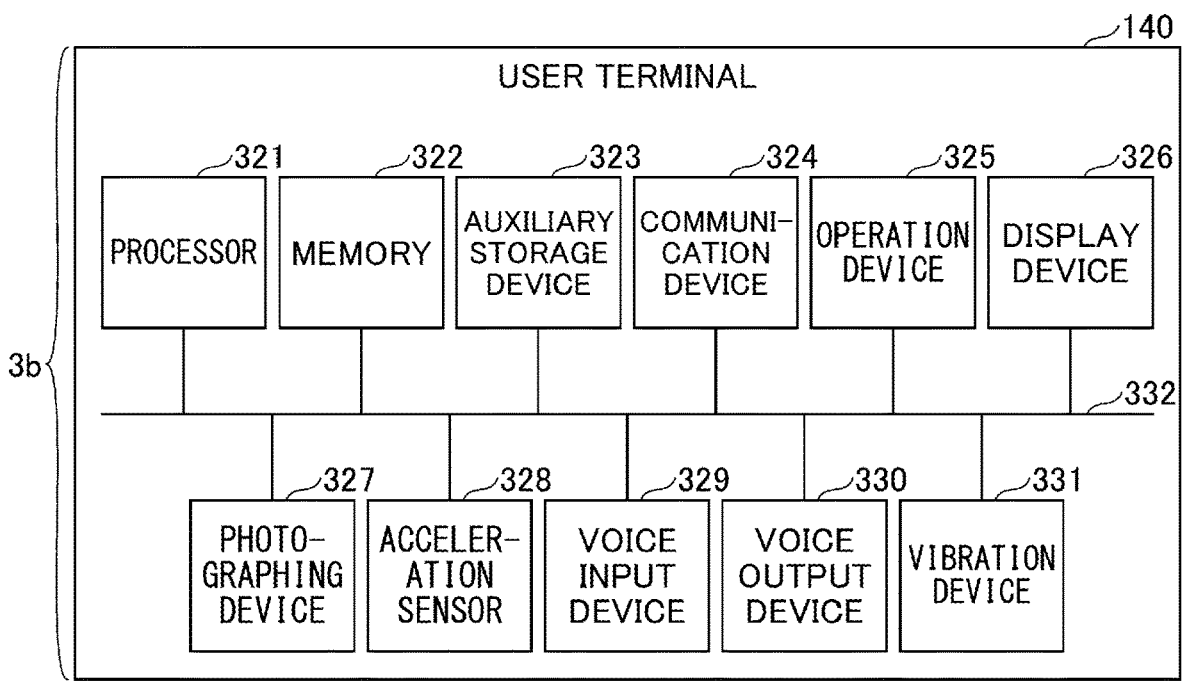

140

USER TERMINAL

321 — PROCESSOR

322 — MEMORY

323 — AUXILIARY STORAGE DEVICE

324 — COMMUNI-CATION DEVICE

325 — OPERATION DEVICE

326 — DISPLAY DEVICE

332

3b

327 — PHOTO-GRAPHING DEVICE

328 — ACCELER-ATION SENSOR

329 — VOICE INPUT DEVICE

330 — VOICE OUTPUT DEVICE

331 — VIBRATION DEVICE

FIG.23
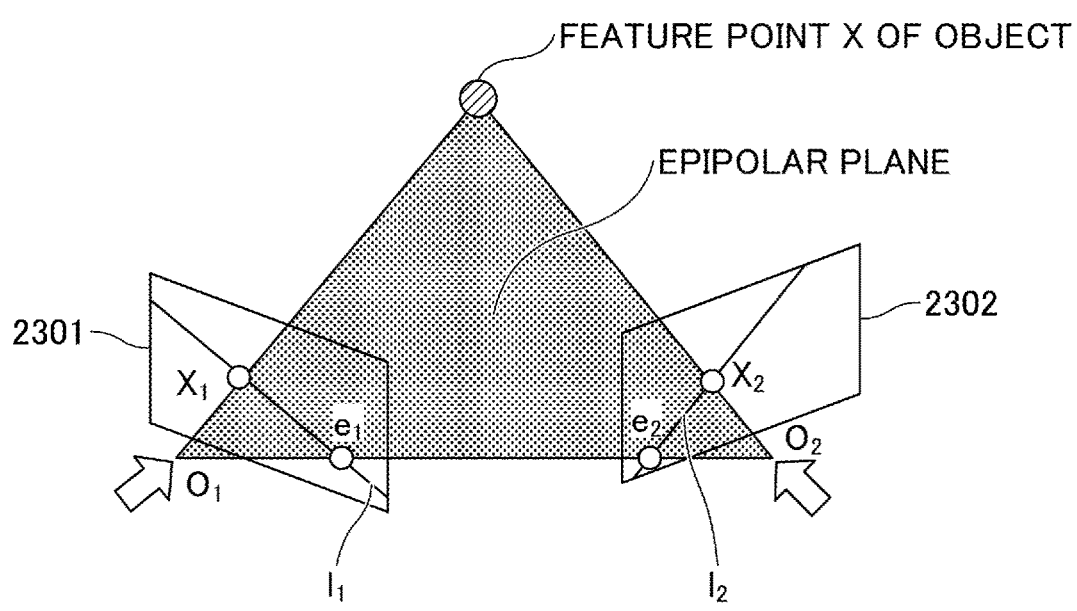
FEATURE POINT X OF OBJECT
EPIPOLAR PLANE
2301
2302
X₁
e₁
O₁
l₁
X₂
e₂
O₂
l₂
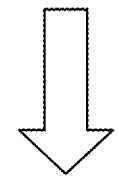
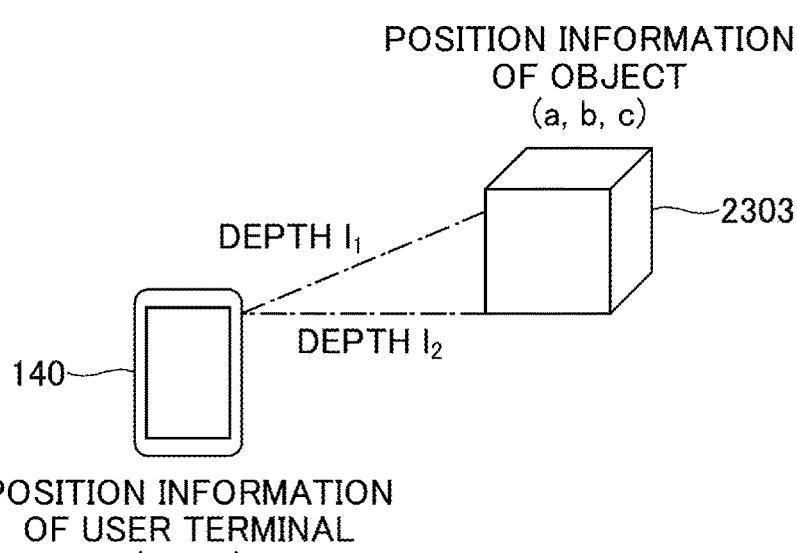
POSITION INFORMATION
OF OBJECT
(a, b, c)
2303
DEPTH l₁
DEPTH l₂
140
POSITION INFORMATION
OF USER TERMINAL
(x, y, z)

1

REGISTRATION SYSTEM, AIR CONDITIONING SYSTEM AND REGISTRATION PROGRAM

TECHNICAL FIELD

The present disclosure relates to a registration system, an air conditioning system, and a registration program.

BACKGROUND ART

In a system that improves comfortableness of a real space such as an air conditioning system, for example, air conditioning for a specific area including a user may be controlled in a different manner from air conditioning for other areas. As one example, PTL 1 below or the like discloses an air conditioning system configured to control an airflow volume and an airflow direction so that in a real space, air to be fed does not hit such a specific area including a user having a portable transmitter.

CITATION LIST

Patent Literature

[PTL 1]
Japanese Laid-Open Patent Application No. 2017-211149

SUMMARY OF INVENTION

Technical Problem

In the case of the above air conditioning system, however, the size and shape of the specific area to be controlled for air conditioning are previously registered, which raises an issue that the user cannot freely change the size and shape.

The present disclosure provides a registration system, an air conditioning system, and a registration program that register a specific area to be controlled in a real space.

Solution to Problem

A first aspect of the present disclosure is a registration system including a control unit and a storage unit, in which the control unit is configured to determine a specific area in a real space based on position information of a user terminal in the real space and based on operation contents of the user terminal, and register the specific area in the storage unit.

According to the first aspect of the present disclosure, it is possible to provide a registration system configured to register a specific area to be controlled in a real space.

Also, a second aspect of the present disclosure is the registration system as recited in the first aspect, in which the control unit determines the specific area in the real space based on a trajectory of the position information of the user terminal in response to a movement operation of the user terminal, and registers the specific area in the storage unit.

Also, a third aspect of the present disclosure is the registration system as recited in the first aspect, in which the user terminal is capable of receiving an instruction operation, and the control unit determines, as the specific area, a peripheral area based on a reference that is the position information of the user terminal in response to the instruction operation received by the user terminal, and registers the specific area in the storage unit.

Also, a fourth aspect of the present disclosure is the registration system as recited in the first aspect, in which the user terminal is capable of receiving an instruction operation, and the control unit determines, as the specific area in the real space, a peripheral area based on a reference that is the position information in the real space of a target identified in response to the instruction operation received by the user terminal, and registers the specific area in the storage unit.

Also, a fifth aspect of the present disclosure is the registration system as recited in the fourth aspect, in which the user terminal is capable of receiving a selective instruction operation, and the control unit determines, as the specific area in the real space, a peripheral area based on a reference that is the position information, in the real space, of a part of the target identified in response to the selective instruction operation received by the user terminal, and registers the specific area in the storage unit.

Also, a sixth aspect of the present disclosure is the registration system as recited in the first aspect, in which the user terminal is capable of receiving a setting operation, and the control unit determines a size or a shape of the specific area based on the setting operation received by the user terminal.

Also, a seventh aspect of the present disclosure is the registration system as recited in the sixth aspect, in which the user terminal is capable of receiving the setting operation, and the control unit determines the size of the specific area based on: the position information of the user terminal with the setting operation of a start point being received by the user terminal or the position information that is a reference based on which the specific area is determined; and the position information of the user terminal with the setting operation of an end point being received by the user terminal.

Also, an eighth aspect of the present disclosure is the registration system as recited in the fourth aspect, in which the user terminal includes a photographing device, and a display device configured to display an image photographed by the photographing device, and a control unit of the user terminal identifies, as the target, an object included in the image.

Also, a ninth aspect of the present disclosure is the registration system as recited in the fourth aspect, in which the user terminal includes a photographing device, and a display device that is configured to display, on a screen, an image photographed by the photographing device and that enables pointing of a position on the screen on which the image is displayed, and a control unit of the user terminal identifies, as the target, an object at the position pointed to among a plurality of objects included in the image.

Also, a tenth aspect of the present disclosure is the registration system as recited in the first aspect, in which the user terminal includes a display device configured to display an image, and a control unit of the user terminal superimposes, on the image, an image indicating the specific area, and displays a superimposed image on the display device.

Also, an eleventh aspect of the present disclosure is the registration system as recited in the tenth aspect, in which
the user terminal includes a photographing device, and
the control unit of the user terminal superimposes a three-dimensional image indicating the specific area on the image photographed by the photographing device, and displays a superimposed image, the three-dimensional image being generated based on the position information and posture information of the user terminal in the real space.

Also, a twelfth aspect of the present disclosure is the registration system as recited in the first aspect, in which
the user terminal includes an output device, and
the output device notifies a stimulus in response to the user terminal being positioned in the specific area in the real space.

Also, a thirteenth aspect of the present disclosure is the registration system as recited in the first aspect, in which
the user terminal includes an output device, and
the output device notifies a different stimulus in accordance with a positional relationship between the specific area in the real space and the user terminal.

Also, a fourteenth aspect of the present disclosure is the registration system as recited in the fourth aspect, in which
the user terminal includes an output device, and
in response to the user terminal being positioned in the specific area in the real space, the output device notifies a different stimulus in accordance with whether the specific area is determined by the position information of the target in the real space, or a different stimulus in accordance with whether the target is a person in a case in which the specific area is determined by the position information of the target in the real space.

Also, a fifteenth aspect of the present disclosure is the registration system as recited in the first aspect, in which
the user terminal includes a sensor, and
a control unit of the user terminal collates shape data of the real space with data measured by the sensor, thereby calculating the position information of the user terminal in the real space.

Also, a sixteenth aspect of the present disclosure is the registration system as recited in the fifteenth aspect, in which
the sensor is a photographing device, and
the control unit of the user terminal collates three-dimensional data in the real space with a map generated from a photographed image photographed by the photographing device, thereby calculating the position information of the user terminal in the real space.

Also, a seventeenth aspect of the present disclosure is the registration system as recited in the first aspect, in which
the control unit calculates the position information of the user terminal in the real space based on data measured by a three-dimensional position measurement sensor attached in the real space.

Also, an eighteenth aspect of the present disclosure is the registration system as recited in the seventeenth aspect, in which
the three-dimensional position measurement sensor includes a plurality of photographing devices attached at different positions, and
the control unit performs matching between photographed images respectively photographed by the plurality of photographing devices, thereby calculating the position information of the user terminal in the real space.

Also, a nineteenth aspect of the present disclosure is the registration system as recited in the first aspect, in which

4 the control unit collates data measured by a sensor included in the user terminal with data measured by a sensor attached in the real space, thereby calculating the position information of the user terminal in the real space.

Also, a twentieth aspect of the present disclosure is the registration system as recited in the first aspect, in which
the user terminal is capable of receiving an air conditioning instruction operation, and
in response to the air conditioning instruction operation received by the user terminal, the control unit performs air conditioning for the specific area in the real space registered in the storage unit.

Also, a twenty-first aspect of the present disclosure is the registration system as recited in the twentieth aspect, in which
the control unit uses a plurality of air conditioning devices attached in the real space, thereby performing different air conditioning control between the specific area in the real space registered in the storage unit and a non-specific area other than the specific area.

Also, an air conditioning system according to a twenty-second aspect of the present disclosure includes the registration system as recited in any one of the first to twenty-first aspects.

According to the twenty-second aspect of the present disclosure, it is possible to provide an air conditioning system configured to register a specific area to be controlled in a real space.

Also, a registration program according to a twenty-third aspect of the present disclosure causes a control unit to execute a registration step of registering, in a storage unit, a specific area in a real space determined based on position information of a user terminal in the real space and based on operation contents of the user terminal.

According to the twenty-third aspect of the present disclosure, it is possible to provide a registration program configured to register a specific area to be controlled in a real space.

BRIEF DESCRIPTION OF DRAWINGS

FIG. 1 is a view illustrating one example of a system configuration of an air conditioning system.

FIG. 3 is a view illustrating one example of a hardware configuration of a control device and a hardware configuration of a user terminal.

FIG. 23 is a view illustrating a calculation example of coordinate information indicating a position of the user terminal in the real space.

DESCRIPTION OF EMBODIMENTS

Figure 2:
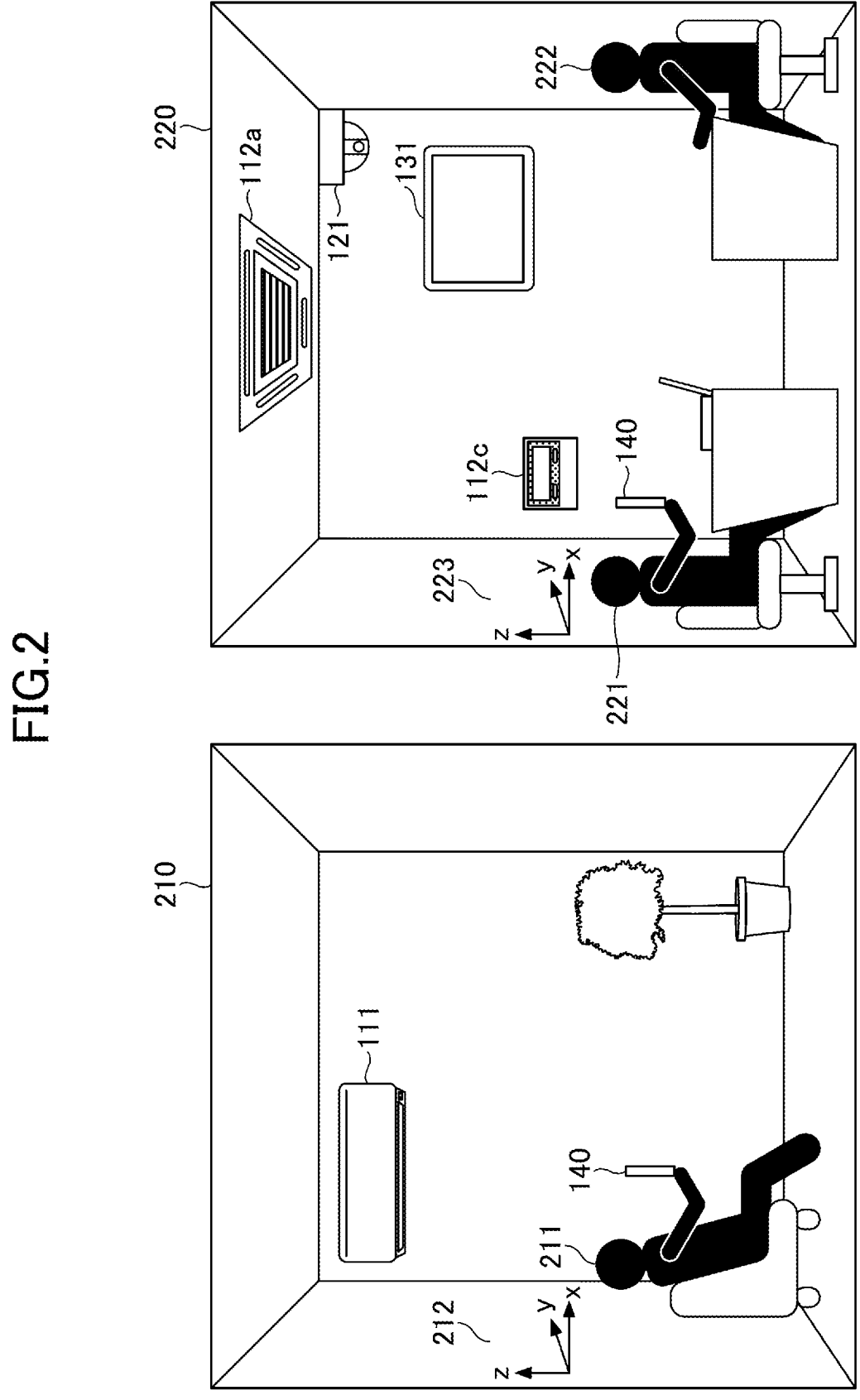
FIG. 2 is a view illustrating one example of a real space to which the air conditioning system is to be applied.

Hereinafter, embodiments will be described with reference to the drawings attached. Note that, in the present specification and the drawings, constituent elements having substantially identical functional configurations are given identical symbols, and duplicate description thereof will be omitted.

First Embodiment

<System Configuration of Air Conditioning System>

First, a system configuration of the air conditioning system according to the first embodiment will be described.

FIG. 1 is a view illustrating one example of the system configuration of the air conditioning system.

As illustrated in FIG. 1, an air conditioning system 100 includes an air conditioning device 110, a photographing device 120, a display device 130, and a user terminal 140. The air conditioning device 110 and the user terminal 140 are connected to each other via wireless communication.

The air conditioning device 110 includes, for example, an indoor unit 111 of a home-use air conditioning device, an indoor unit 112*a* of a business-use air conditioning device, an edge device 112*b* (control device), and an operation panel 112*c*.

The indoor unit 111 performs air conditioning control of the real space.

Specifically, in order for the indoor unit 111 to perform air conditioning control of the real space, a built-in control device is operated based on:

various instructions and various information transmitted from the user terminal 140 via wireless communication;

photographed images (e.g., RGB images) transmitted from the photographing device 120; and data measured by a sensor included in the indoor unit 111. Note that, the indoor unit 111 may include the built-in photographing device 120. Also, the indoor unit 111 transmits various information generated through operation of the built-in control device to the user terminal 140 via wireless communication or the display device 130.

Likewise, the indoor unit 112*a* performs air conditioning control of the real space.

Specifically, in order for the indoor unit 112*a* to perform air conditioning control of the real space, the edge device 112*b* (control device) is operated based on:

various instructions and various information transmitted from the operation panel 112*c* or the user terminal 140 via wireless communication;

photographed images transmitted from the photographing device 120; and data measured by a sensor included in the indoor unit 112*a*.

Also, the indoor unit 112*a* transmits various information generated through operation of the edge device 112*b* to the user terminal 140 via wireless communication or the display device 130. Note that, the operation panel 112*c* may also function as the display device 130.

In the first embodiment, the built-in control device of the indoor unit 111 and the edge device 112*b* connected to the indoor unit 112*a* can perform air conditioning control for the specific area in the real space, the air conditioning control being different from air conditioning control for a non-specific area (area other than the specific area).

The photographing device 120 includes, for example, an indoor security camera 121, a monitoring camera 122, and the like. The security camera 121, the monitoring camera 122, or the like photographs the real space in which the indoor unit 111 of the home-use air conditioning device is installed or the real space in which the indoor unit 112*a* of the business-use air conditioning device is installed, and transmits the photographed images to the air conditioning device 110.

The display device 130 includes, for example, a monitor 131 and the like. The monitor 131 or the like is installed in the real space in which the indoor unit 111 of the home-use air conditioning device is installed or the real space in which the indoor unit 112*a* of the business-use air conditioning device is installed. Also, the monitor 131 and the like display a display image generated in the built-in control device of the indoor unit 111 or the edge device 112*b* connected to the indoor unit 112*a*.

The user terminal 140 includes, for example, a smart phone 141, a remote controller 142 of the home-use air conditioning device, a wearable device (not illustrated), and the like. The smart phone 141, the remote controller 142, the wearable device (not illustrated), or the like is held (or worn) by a user in the real space, and transmits various instructions and various information input by the user to the air conditioning device 110. Thereby, the user can register the specific area in the real space via the user terminal 140.

Also, the smart phone 141, the remote controller 142, the wearable device (not illustrated), or the like notifies the user of the registered specific area based on the various information transmitted from the air conditioning device 110. Thereby, the user can understand, via the user terminal 140, which area in the real space has been registered as the specific area.

Specific Examples of the Real Space

Next, specific examples of the real space to which the air conditioning system 100 is to be applied will be described. FIG. 2 is a view illustrating one example of the real space to which the air conditioning system is to be applied.

In FIG. 1, a real space 210 is a user 211's own room. The air conditioning system 100 applied to the real space 210 includes the indoor unit 111 having the built-in photographing device 120, and the smart phone 141. Note that, a control device (not illustrated) of the indoor unit 111 identifies respective positions in the real space 210 from coordinate information based on a coordinate axis 212.

Meanwhile, a real space 220 is an office of users 221 and 222. The air conditioning system 100 applied to the real space 220 includes the indoor unit 112*a*, the edge device 112*b* (not illustrated), the operation panel 112*c*, the security camera 121, the monitor 131, and the smart phone 141. Note that, the edge device 112*b* (not illustrated) identifies respective positions in the real space 220 from coordinate information based on a coordinate axis 223.

<Hardware Configurations of Control Device and User Terminal>

Next, the hardware configuration of the user terminal 140, and the hardware configuration of the built-in control device of the indoor unit 111 of the air conditioning device 110 or the edge device 112*b* (control device) connected to the indoor unit 112*a* of the air conditioning device 110 will be described with reference to FIG. 3.

FIG. 3 is a view illustrating one example of the hardware configuration of the control device and the hardware configuration of the user terminal.

(1) Hardware Configuration of the Control Device

The part 3*a* of FIG. 3 illustrates one example of the hardware configuration of the control device of the air conditioning device 110. As illustrated in 3a of FIG. 3, the control device of the air conditioning device 110 includes a processor 301, a memory 302, and an auxiliary storage device 303. Also, the control device of the air conditioning device 110 includes an I/F (Interface) device 304 and a communication device 305. Note that, the hardware devices of the control device of the air conditioning device 110 are connected to each other via a bus 306.

The processor 301 includes various arithmetic devices such as a CPU (Central Processing Unit). The processor 301 reads out various programs (e.g., the registration program described below) on the memory 302 and executes these programs.

The memory 302 includes main storage devices such as a ROM (Read Only Memory) and a RAM (Random Access Memory). The processor 301 and the memory 302 form what is called a computer ("control unit" as hardware). The processor 301 executes the various programs read-out on the memory 302, and thereby the control device of the air conditioning device 110 realizes various functions.

The auxiliary storage device 303 is one example of the storage unit and stores various programs and various data used when the various programs are executed by the processor 301.

The I/F device 304 is a connection device configured to connect the control device of the air conditioning device 110 to other devices. In the present embodiment, the other devices include the photographing device 120 and the display device 130. Also, in the present embodiment, the other devices include a radio wave transceiver device 310 that is one example of the sensor included in the indoor unit 111 of the air conditioning device 110 or the sensor included in the indoor unit 112*a*. The radio wave transceiver device 310 is, for example, a TOF depth sensor (one example of the three-dimensional position measurement sensor) that scans the real space with laser light and thereby obtains radio wave information (reflection signals of the laser light). By using radio wave information obtained by the radio wave transceiver device 310 in a given direction in the real space 210 or 220, it is possible to calculate coordinate information (what is called a depth map) that indicates the positions of a plurality of objects in the real space 210 or 220.

The communication device 305 is a communication device configured to transmit and receive information between the control device of the air conditioning device 110, and the user terminal 140.

(2) Hardware Configuration of the User Terminal

Meanwhile, the part 3*b* of FIG. 3 illustrates one example of the hardware configuration of the user terminal 140. As illustrated in 3b of FIG. 3, the user terminal 140 includes a processor 321, a memory 322, an auxiliary storage device 323, a communication device 324, an operation device 325, and a display device 326. Also, the user terminal 140 includes a photographing device 327, an acceleration sensor 328, a voice input device 329, a voice output device 330, and a vibration device 331. Note that, the hardware devices of the user terminal 140 are connected to each other via a bus 332.

The processor 321 includes various arithmetic devices such as a CPU (Central Processing Unit). The processor 321 reads out various programs (e.g., an air conditioning operation program described below) on the memory 322 and executes these programs.

The memory 322 includes main storage devices such as a ROM (Read Only Memory) and a RAM (Random Access Memory). The processor 321 and the memory 322 form what is called a computer ("control unit" as hardware). The processor 321 executes the various programs read-out on the memory 322, and thereby the user terminal 140 realizes various functions.

The auxiliary storage device 323 stores various programs and various data used when the various programs are executed by the processor 321.

The communication device 324 is a communication device configured to transmit and receive information between the user terminal 140 and the control device of the air conditioning device 110.

The operation device 325 receives various instructions from the users 211, 221, 222, etc. to the user terminal 140. The display device 326 displays a display image based on various information transmitted from the control device of the air conditioning device 110.

The photographing device 327 photographs, for example, the interiors of the real spaces 210 and 220. The acceleration sensor 328 measures the acceleration of the user terminal 140 in directions of three axes. The voice input device 329 inputs voices of the users 211, 221, 222, etc. The voice output device 330 outputs, for example, sound based on various information transmitted from the control device of the air conditioning device 110. The vibration device 331 outputs, for example, vibration based on various information transmitted from the control device of the air conditioning device 110.

<Operation Mode and Operation Screen>

Figure 4:
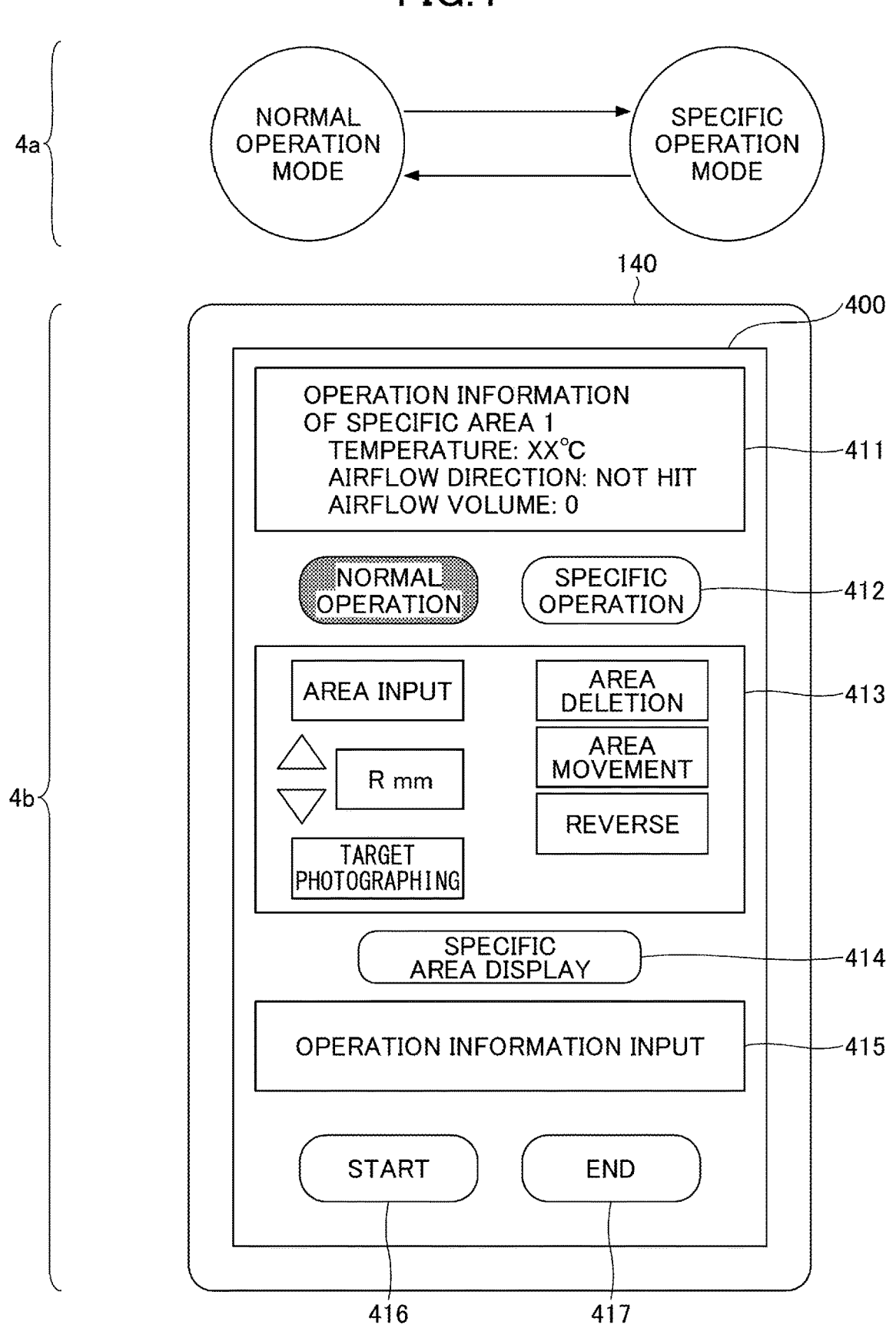
FIG. 4 is a view illustrating one example of an operation mode of the air conditioning system and an operation screen.

Next, an operation mode realized by the air conditioning operation program executed by the user terminal when the air conditioning system 100 is operated, and an operation screen to be displayed on the user terminal 140 will be described. FIG. 4 is a view illustrating one example of the operation mode of the air conditioning system and the operation screen.

The part 4a of FIG. 4 illustrates operation modes when the air conditioning system 100 is operated. As illustrated in 4a of FIG. 4, during operation of the air conditioning system 100, the operation mode is switched to either "normal operation mode" or "specific operation mode".

The "normal operation mode" is a mode of performing air conditioning control of the real spaces 210 and 220 by operating the air conditioning system 100 based on conventional operation information. Meanwhile, the "specific operation mode" is a mode of performing air conditioning control under different operation information between the specific area and the non-specific area when the air conditioning system 100 is operated.

Also, the part 4b of FIG. 4 illustrates one example of an operation screen to be displayed on the user terminal 140 when the air conditioning system 100 is operated in the specific operation mode. As illustrated in 4b of FIG. 4, when a "specific operation" button 412 is pressed, the operation screen is switched to an operation screen 400 for the specific operation mode. The operation screen 400 includes an operation information display section 411, a specific area input section 413, a "specific area display" button 414, an "operation information input" button 415, a "start" button 416, and a "stop" button 417.

The operation information display section 411 displays operation information set to the specific area. When there are a plurality of specific areas, the operation information is displayed for each of the specific areas. The example of FIG. 4 illustrates a situation in which temperature="XX° C.", airflow direction="not hit", and airflow volume="0" are set to "specific area 1" as operation information.

The specific area input section 413 includes instruction buttons used when the users 211, 221, 222, etc. input the specific area. An "area input" button is a button to be pressed for instructing an input start of the specific area.

An "increase/decrease" button is a button to be pressed for inputting the size of the specific area. Note that, instead of inputting the size of the specific area to a "radius information" input section ("R mm" in the drawing) by pressing the "increase/decrease" button, a setting operation may be performed to directly input a value indicating the size of the specific area to the "radius information" input section.

A "target photographing" button is a button to be pressed for photographing a target in order to set an area of the target as the specific area. When the "target photographing" button is pressed, the photographing device 327 is driven and photographing is started.

An "area deletion" button is a button to be pressed for deleting the specific area that has already been registered. An "area movement" button is a button to be pressed for moving the specific area that has already been registered.

A "reverse" button is a button to be pressed for switching between: operation information used for performing air conditioning control for the specific area that has already been registered; and operation information used for performing air conditioning control for the non-specific area that is different from the specific area.

The "specific area display" button 414 is pressed to drive the photographing device 327. Photographed images photographed by the photographing device 327 are displayed on a display screen, and display images based on various information transmitted from the control device of the air conditioning device 110 are superimposed for display.

The "operation information input" button 415 is a button to be pressed for the users 211, 221, 222, etc. to input the operation information. When the "operation information input" button 415 is pressed, available items in the specific operation mode are displayed, and the users 211, 221, 222, etc. input the operation information corresponding to each of the items.

Note that, the operation information may be configured such that the same contents can be registered for each of the specific areas, or may be configured such that different contents can be registered for each of the positions in the same specific area. Also, the operation information may be configured such that the history of the previously registered operation information is read out and the previously registered operation information can be registered for other specific areas. Furthermore, the operation information may be configured such that the operation information associated with each of the currently registered specific areas can be exchanged between the specific areas for registration.

The "start" button 416 is a button for operation of air conditioning instructions, the button being used to instruct the air conditioning device 110 so as to start air conditioning control in the specific operation mode. The "stop" button 417 is a button for operation of air conditioning instructions, the button being used to instruct the air conditioning device 110 so as to stop air conditioning control in the specific operation mode.

<Functional Configuration of the Control Device>

Figure 5:
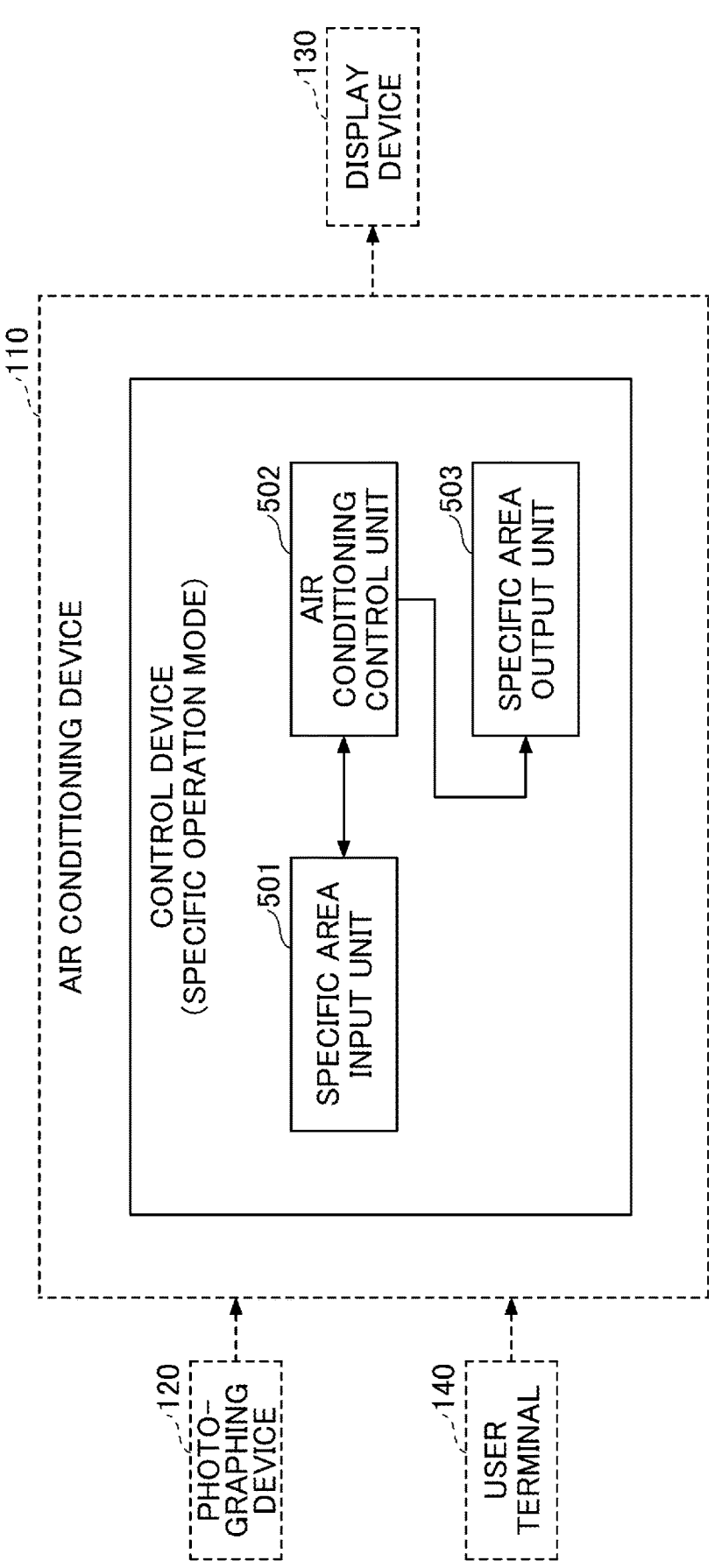
FIG. 5 is a view illustrating one example of a functional configuration of the control device in a specific operation mode.

Next, the functional configuration of the control device of the air conditioning device 110 in the specific operation mode will be described. FIG. 5 is a view illustrating one example of the functional configuration of the control device in the specific operation mode. As described above, the control device of the air conditioning device 110 includes the registration program installed therein, and by this program being executed, the control device of the air conditioning device 110 functions as a specific area input unit 501, an air conditioning control unit 502, and a specific area output unit 503.

The specific area input unit 501 determines the specific area and the operation information based on, for example: the various instructions and the various information transmitted from the user terminal 140; the photographed images transmitted from the photographing device 120; and the data measured by the sensor included in the indoor unit 111. Also, the specific area input unit 501 registers the determined specific area and operation information in the air conditioning control unit 502. Specifically, the specific area input unit 501 notifies the air conditioning control unit 502 of the determined specific area and operation information. Thereby, the air conditioning control unit 502 stores the notified specific area and operation information in a specific area and operation information storage unit, which is a storage area that can be used by the air conditioning control unit 502 in the auxiliary storage device 303 included in the control device of the air conditioning device 110.

The air conditioning control unit 502 performs air conditioning control based on the specific area and the operation information that have been registered by the specific area input unit 501.

The specific area output unit 503 transmits, to the display device 130, an image (specific area image) for notifying the users 211, 221, 222, etc. of the specific area registered in the air conditioning control unit 502.

<Functional Configuration of the Specific Area Input Unit and Specific Example of the Specific Area Determination Process>

Next, details of the functional configuration of the specific area input unit 501 (here, a functional configuration in relation to determination of the specific area) and a specific example of the specific area determination process will be described with reference to patterns (1) to (6).

(1) Pattern 1

Figure 6:
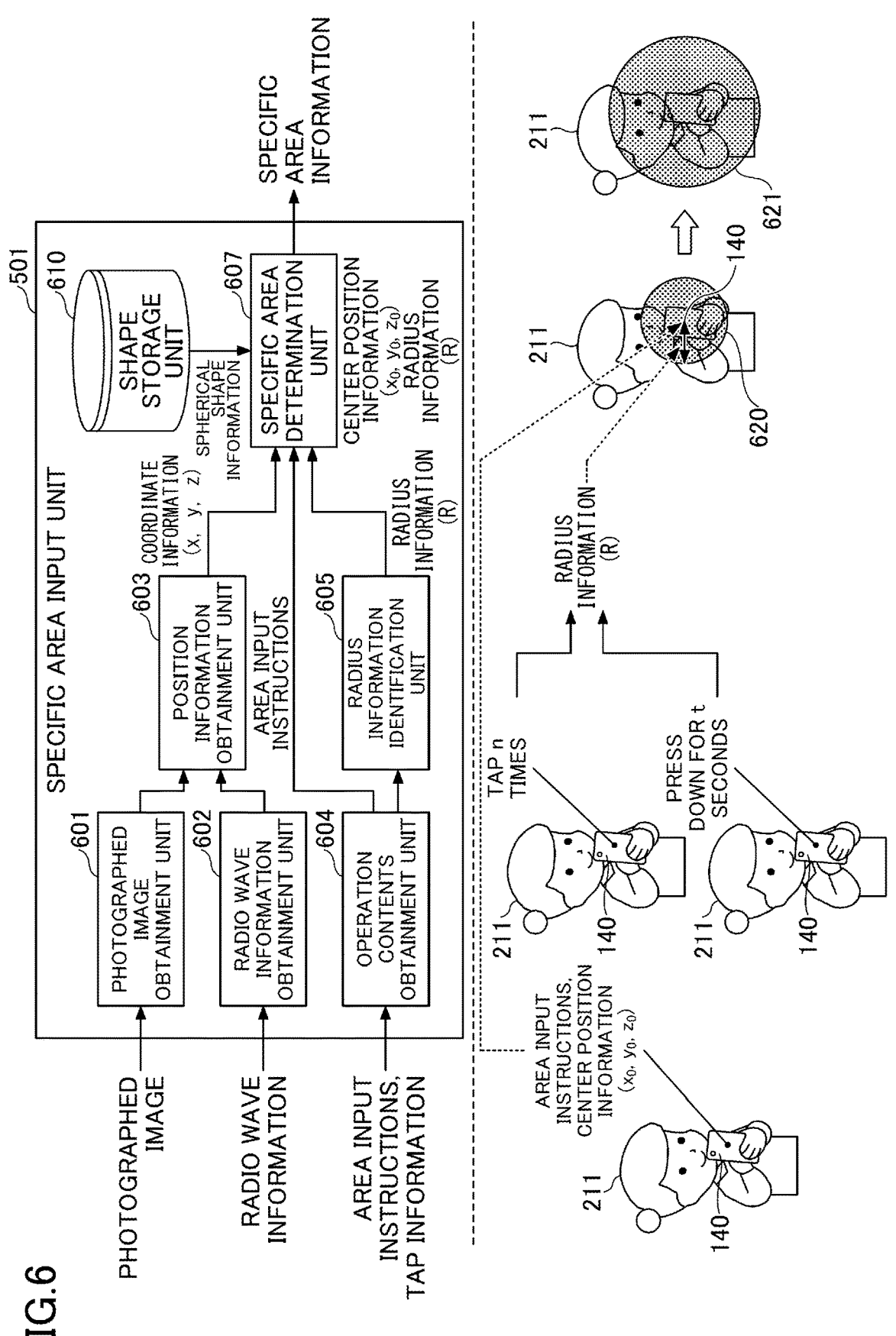
FIG. 6 is a first representation illustrating a functional configuration of a specific area input unit and a specific example of a specific area determination process.

FIG. 6 is a first representation illustrating the functional configuration of the specific area input unit and a specific example of the specific area determination process. As illustrated in FIG. 6, the specific area input unit 501 includes a photographed image obtainment unit 601, a radio wave information obtainment unit 602, a position information obtainment unit 603, an operation contents obtainment unit 604, a radius information identification unit 605, and a specific area determination unit 607.

The photographed image obtainment unit 601 obtains a photographed image photographed by the photographing device 120, and notifies the position information obtainment unit 603 of the obtained photographed image.

The radio wave information obtainment unit 602 obtains radio wave information transmitted/received by the radio wave transceiver device 310, and notifies the position information obtainment unit 603 of the obtained radio wave information.

The position information obtainment unit 603 calculates coordinate information $(x, y, z)$ indicating the position of the user terminal 140 in the real space 210 or 220 based on the notified photographed image and radio wave information. For example, the radio wave information obtainment unit 602 calculates coordinate information indicating the positions of a plurality of objects in the real space based on the radio wave information, and extracts the coordinate information indicating the position of the user terminal 140, whose image has been recognized based on the photographed images, from among the calculated coordinate information indicating the positions of the plurality of objects.

The operation contents obtainment unit 604 obtains operation contents transmitted from the user terminal 140. The example of FIG. 6 illustrates a situation in which the operation contents are as follows; i.e., the "area input" button has been pressed and the "increase/decrease" button has been pressed.

When the operation contents obtainment unit 604 has obtained area input instructions in response to pressing of the "area input" button, the operation contents obtainment unit 604 notifies the specific area determination unit 607 of the area input instructions. Note that, when the specific area determination unit 607 has been notified of the area input instructions from the operation contents obtainment unit 604, the specific area determination unit 607 maintains the coordinate information, which has been notified from the position information obtainment unit 603, as center position information $(x_0, y_0, z_0)$ indicating the position of the center point of the specific area.

Also, when the operation contents obtainment unit 604 has obtained tap information reflecting tapping of the "increase/decrease" button "n" times (repeated tapping operations), the operation contents obtainment unit 604 notifies the radius information identification unit 605 of the tap information. Alternatively, when the operation contents obtainment unit 604 has obtained tap information reflecting pressing down of the "increase/decrease" button for "t" seconds (pressing-down operation lasting for a predetermined period of time), the operation contents obtainment unit 604 notifies the radius information identification unit 605 of the tap information.

The radius information identification unit 605 calculates radius information (R) based on the tap information notified from the operation contents obtainment unit 604, and notifies the specific area determination unit 607 of the calculated radius information (R). The radius information identification unit 605 calculates the radius information (R) in proportion to the number of tapping operations (repeated number) or the time of pressing down (lasting time).

The specific area determination unit 607 refers to a shape storage unit 610, and obtains shape information of a predetermined shape of the specific area. The example of FIG. 6 illustrates a situation in which spherical shape information has been obtained by referring to the shape storage unit 610. However, the shape information obtained by referring to the shape storage unit 610 is not limited to the spherical shape information and may be, for example, any other three-dimensional shape information such as cone shape information.

Also, the specific area determination unit 607 determines a specific area 621 based on: the center position information $(x_0, y_0, z_0)$ of the specific area; the radius information (R) notified by the radius information identification unit 605; and the spherical shape information obtained from the shape storage unit 610. That is, the specific area determination unit 607 determines, as the specific area 621, a peripheral area based on a reference that is the center position information.

The example of FIG. 6 illustrates a situation in which a specific area 620 has been generated based on unfinished tap information. In this way, according to the example of FIG. 6, the user 211 can adjust the size of the specific area by adjusting the number of tapping operations or the time of pressing down.

Note that, the user terminal 140 may notify the user 211 with a predetermined stimulus (sound, light, or vibration) every time the radius information (R) changes by a certain amount in response to the user 211 who taps, or presses down the "increase/decrease" button. Thereby, the user 211 can understand that the radius information (R) has changed by a certain amount.

(2) Pattern 2

Figure 7:
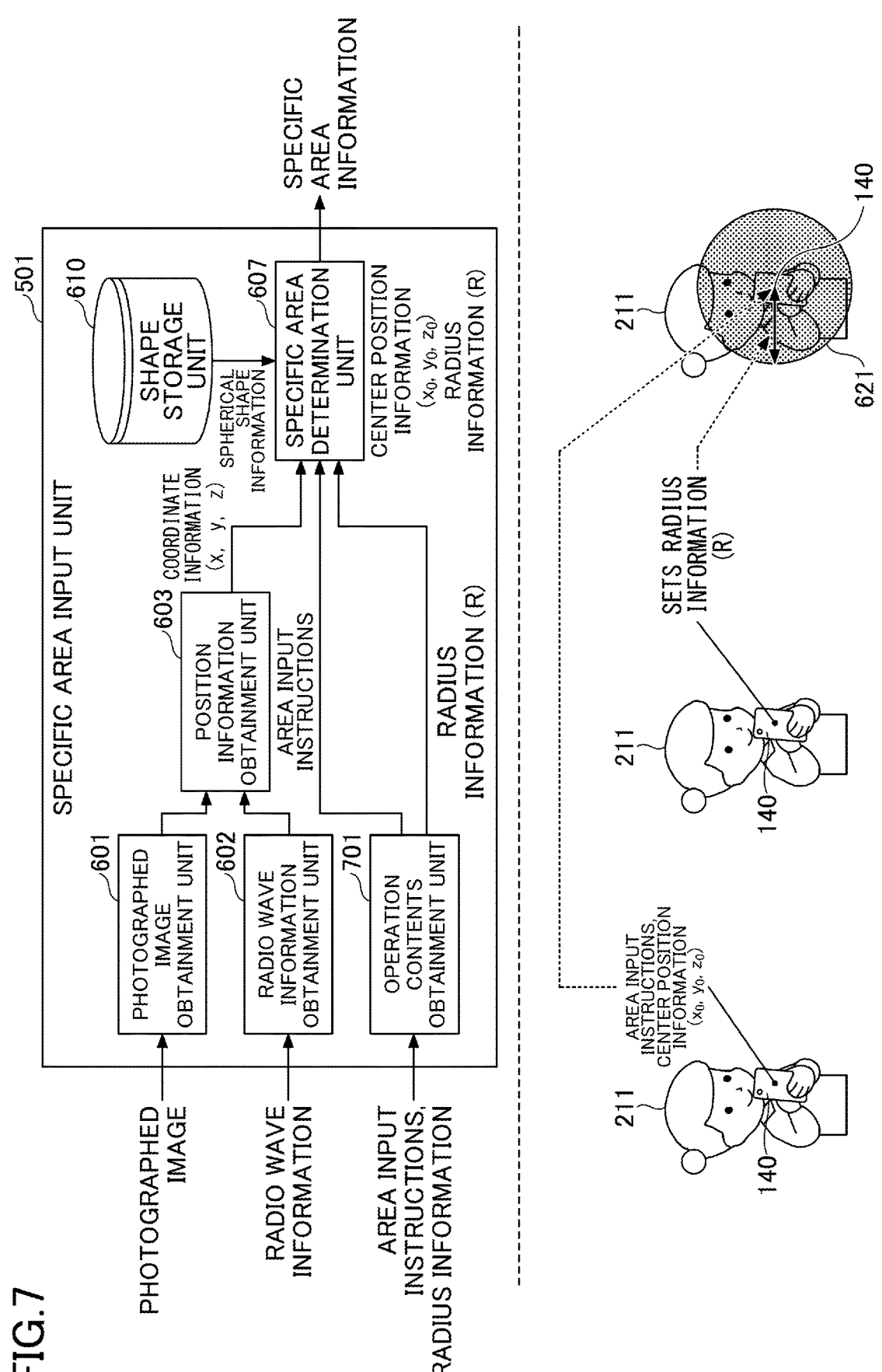
FIG. 7 is a second representation illustrating the functional configuration of the specific area input unit and a specific example of the specific area determination process.

FIG. 7 is a second representation illustrating the functional configuration of the specific area input unit and a specific example of the specific area determination process. As illustrated in FIG. 7, the specific area input unit 501 includes the photographed image obtainment unit 601, the radio wave information obtainment unit 602, the position information obtainment unit 603, an operation contents obtainment unit 701, and the specific area determination unit 607.

Of these, the photographed image obtainment unit 601 to the position information obtainment unit 603 have already been described with reference to FIG. 6, and thus, description thereof will be omitted here.

The operation contents obtainment unit 701 obtains operation contents transmitted from the user terminal 140. The example of FIG. 7 illustrates a situation in which the operation contents are as follows; i.e., the "area input" button has been pressed and the radius information (R) has been directly input to the "radius information" input section.

When the operation contents obtainment unit 701 has obtained the area input instructions in response to pressing of the "area input" button, the operation contents obtainment unit 701 notifies the specific area determination unit 607 of the area input instructions. Note that, when the specific area determination unit 607 has been notified of the area input instructions from the operation contents obtainment unit 604, the specific area determination unit 607 maintains the coordinate information, which has been notified from the position information obtainment unit 603, as the center position information $(x_0, y_0, z_0)$ of the specific area.

Also, when the operation contents obtainment unit 701 has obtained the radius information (R) in response to direct input of the radius information (R) to the "radius information" input section, the operation contents obtainment unit 701 notifies the specific area determination unit 607 of the obtained radius information (R).

Note that, a determination method of the specific area 621 by the specific area determination unit 607 is similar to that of FIG. 6, and thus, description thereof will be omitted here.

(3) Pattern 3

Figure 8:
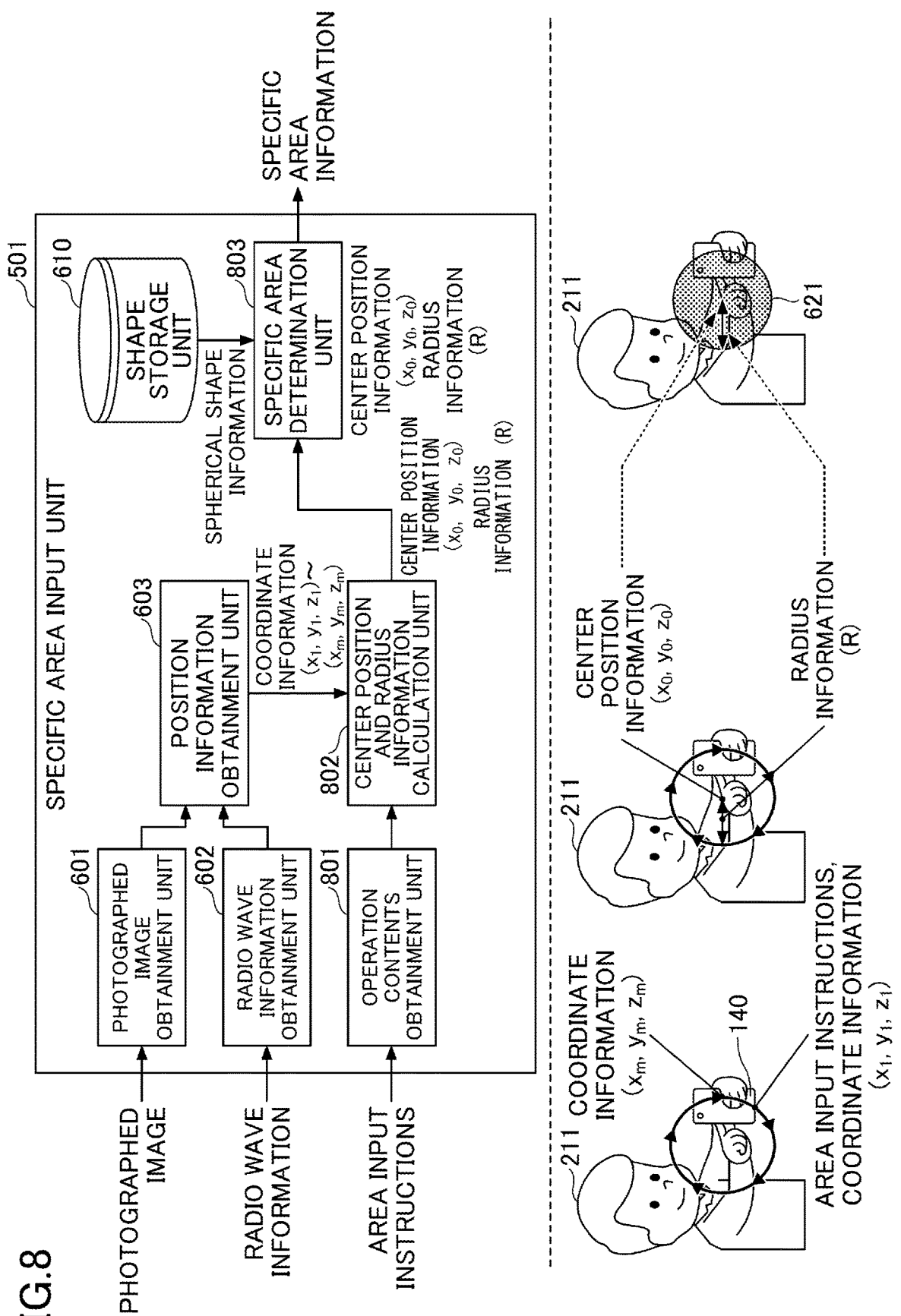
FIG. 8 is a third representation illustrating the functional configuration of the specific area input unit and a specific example of the specific area determination process.

FIG. 8 is a third representation illustrating the functional configuration of the specific area input unit and a specific example of the specific area determination process. As illustrated in FIG. 8, the specific area input unit 501 includes the photographed image obtainment unit 601, the radio wave information obtainment unit 602, the position information obtainment unit 603, an operation contents obtainment unit 801, a center position and radius information calculation unit 802, and a specific area determination unit 803.

Of these, the photographed image obtainment unit 601 to the position information obtainment unit 603 have already been described with reference to FIG. 6, and thus, description thereof will be omitted here. However, in the case of FIG. 8, the position information obtainment unit 603 notifies the center position and radius information calculation unit 802 of the calculated coordinate information.

The operation contents obtainment unit 801 obtains the operation contents transmitted from the user terminal 140, and notifies the center position and radius information calculation unit 802 of the obtained operation contents. The example of FIG. 8 illustrates a situation in which the operation contents are as follows; i.e., the area input instructions have been notified in response to pressing of the "area input" button.

Note that, as illustrated in FIG. 8, in the case of pattern 3, the user 211 presses the "area input" button, and then moves the user terminal 140 so as to draw an arc trajectory in the real space 210, thereby designating the position and the size of the specific area.

Specifically, the center position and radius information calculation unit 802 is notified of the area input instructions from the operation contents obtainment unit 801, and then obtains the coordinate information (coordinate information $(x_1, y_1, z_1)$ to $(x_m, y_m, z_m)$) during movement, which has been notified from the position information obtainment unit 603.

Also, the center position and radius information calculation unit 802 calculates the center position information $(x_0, y_0, z_0)$ indicating the position of the center point of the arc based on the obtained coordinate information (coordinate information $(x_1, y_1, z_1)$ to $(x_m, y_m, z_m)$), and notifies the specific area determination unit 803 of the calculated center position information.

Also, the center position and radius information calculation unit 802 calculates the maximum value of the distances from the center position information $(x_0, y_0, z_0)$, from among the obtained coordinate information (coordinate information $(x_1, y_1, z_1)$ to $(x_m, y_m, z_m)$). Furthermore, the center position and radius information calculation unit 802 notifies the specific area determination unit 803 of the calculated maximum value as the radius information (R).

The specific area determination unit 803 refers to the shape storage unit 610, and obtains shape information of a predetermined shape of the specific area. The example of FIG. 8 illustrates a situation in which spherical shape information has been obtained by referring to the shape storage unit 610. However, the shape information obtained by referring to the shape storage unit 610 is not limited to the spherical shape information and may be, for example, any other three-dimensional shape information such as cone shape information.

Also, the specific area determination unit 803 determines the specific area 621 based on: the center position information $(x_0, y_0, z_0)$ and the radius information (R) that have been notified by the center position and radius information calculation unit 802; and the spherical shape information obtained from the shape storage unit 610. That is, the specific area determination unit 803 determines, as the specific area 621, a peripheral area based on a reference that is the center position information.

(4) Pattern 4

Figure 9:
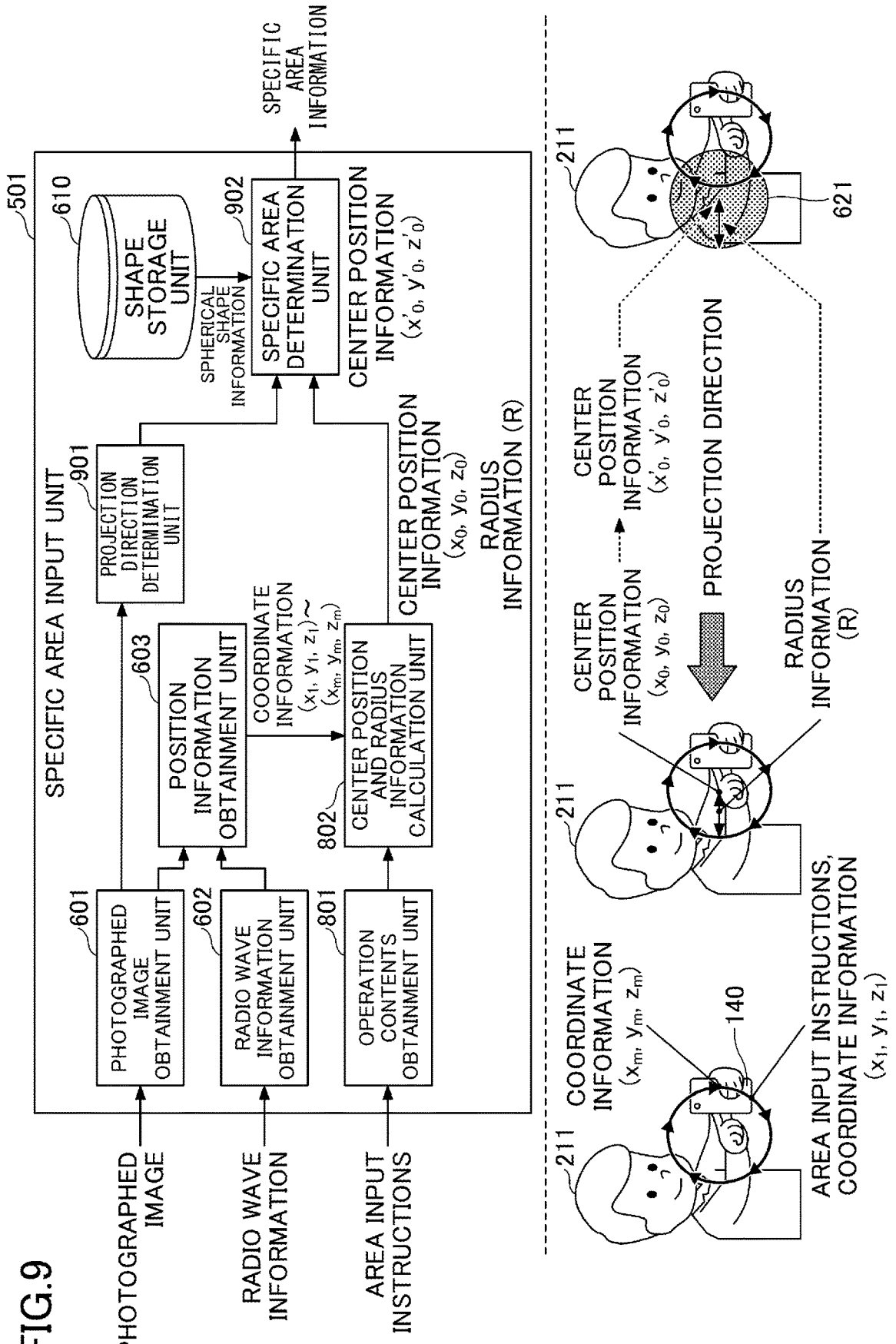
FIG. 9 is a fourth representation illustrating the functional configuration of the specific area input unit and a specific example of the specific area determination process.

FIG. 9 is a fourth representation illustrating the functional configuration of the specific area input unit and a specific example of the specific area determination process. As illustrated in FIG. 9, the specific area input unit 501 includes the photographed image obtainment unit 601, the radio wave information obtainment unit 602, the position information obtainment unit 603, the operation contents obtainment unit 801, the center position and radius information calculation unit 802, a projection direction determination unit 901, and a specific area determination unit 902.

Of these, the photographed image obtainment unit 601 to the position information obtainment unit 603 have already been described with reference to FIG. 6, and thus, description thereof will be omitted here. Also, the operation contents obtainment unit 801 and the center position and radius information calculation unit 802 have already been described with reference to FIG. 8, and thus, description thereof will be omitted here.

The projection direction determination unit 901 notifies the specific area determination unit 902 of a projection direction that is a photographing direction in which the photographing device 120 has photographed the user terminal 140.

The specific area determination unit 902 refers to the shape storage unit 610, and obtains shape information of a predetermined shape of the specific area. The example of FIG. 9 illustrates a situation in which spherical shape information has been obtained by referring to the shape storage unit 610.

Also, the specific area determination unit 902 calculates the specific area based on: the center position information $(x_0, y_0, z_0)$ and the radius information (R) that have been notified by the center position and radius information calculation unit 802; and the spherical shape information obtained from the shape storage unit 610. Furthermore, the specific area determination unit 902 calculates center position information $(x'_0, y'_0, z'_0)$ based on the projection direction, which has been notified by the projection direction determination unit 901, by shifting the position of the center point toward the projection direction by a predetermined amount with the size and the shape of the calculated specific area being maintained. Thereby, the specific area determination unit 902 determines a projected area as the specific area 621. That is, the specific area determination unit 902 determines, as the specific area 621, a peripheral area based on a reference that is the center position information.

Note that, the example of FIG. 9 illustrates a case in which the calculation of the specific area is followed by the projection; however, the specific area may be calculated after projection of the trajectory based on the movement operation of the user terminal 140. Specifically, first, the coordinate information (coordinate information $(x_1, y_1, z_1)$ to $(x_m, y_m, z_m)$) is projected toward the projection direction based on the photographed image photographed by the photographing device 120. Subsequently, a projected area identified by the coordinate information after the projection (an area identified based on the center position information, the radius information (R), and the spherical shape information) is determined as the specific area.

(5) Pattern 5

Figure 10:
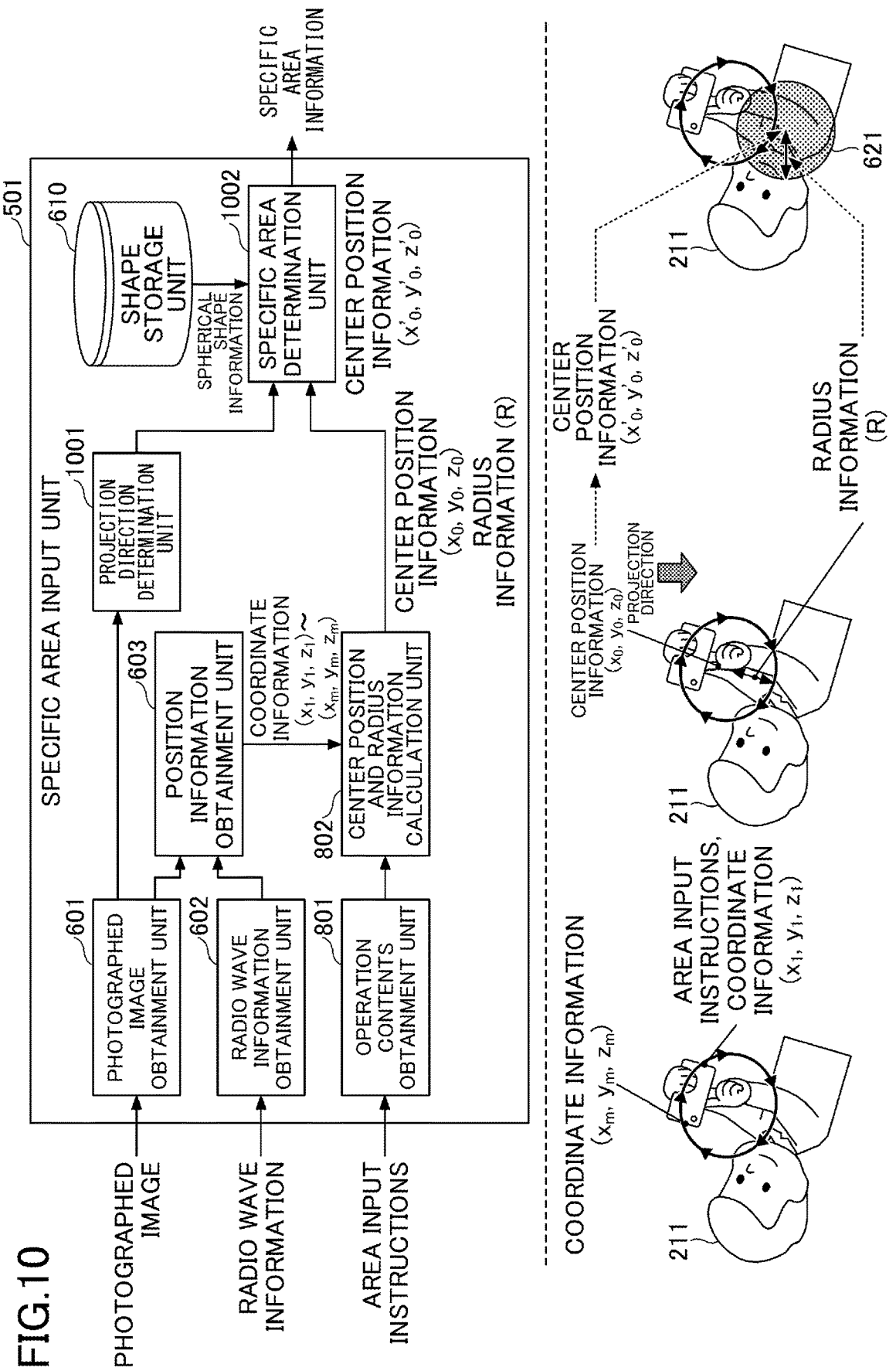
FIG. 10 is a fifth representation illustrating the functional configuration of the specific area input unit and a specific example of the specific area determination process.

FIG. 10 is a fifth representation illustrating the functional configuration of the specific area input unit and a specific example of the specific area determination process. As illustrated in FIG. 10, the specific area input unit 501 includes the photographed image obtainment unit 601, the radio wave information obtainment unit 602, the position information obtainment unit 603, the operation contents obtainment unit 801, the center position and radius information calculation unit 802, a projection direction determination unit 1001, and a specific area determination unit 1002.

Of these, the photographed image obtainment unit 601 to the position information obtainment unit 603 have already been described with reference to FIG. 6, and thus, description thereof will be omitted here. Also, the operation contents obtainment unit 801 and the center position and radius information calculation unit 802 have already been described with reference to FIG. 8, and thus, description thereof will be omitted here.

The projection direction determination unit 1001 determines, as a projection direction, a predetermined direction in accordance with a positional relationship between the user terminal 140 and the user 211, and notifies the specific area determination unit 1002 of the determined projection direction.

The specific area determination unit 1002 refers to the shape storage unit 610, and obtains shape information of a predetermined shape of the specific area. The example of FIG. 10 illustrates a situation in which spherical shape information has been obtained by referring to the shape storage unit 610.

Also, the specific area determination unit 1002 calculates the specific area based on: the center position information $(x_0, y_0, z_0)$ and the radius information (R) that have been notified by the center position and radius information calculation unit 802; and the spherical shape information obtained from the shape storage unit 610. Furthermore, the specific area determination unit 1002 calculates center position information $(x'_0, y'_0, z'_0)$ based on the projection direction, which has been notified by the projection direction determination unit 1001, by shifting the position of the center point toward the projection direction by a predetermined amount with the size and the shape of the calculated specific area being maintained. Thereby, the specific area determination unit 1002 determines a projected area as the specific area 621. That is, the specific area determination unit 1002 determines, as the specific area 621, a peripheral area based on a reference that is the center position information.

Note that, the example of FIG. 10 illustrates a case in which the calculation of the specific area is followed by the projection; however, the specific area may be calculated after projection of the trajectory based on the movement operation of the user terminal 140.

Specifically, first, the coordinate information (coordinate information $(x_1, y_1, z_1)$ to $(x_m, y_m, z_m)$) is projected based on a positional relationship between the user 211 and the user terminal 140 that are identified from the photographed image photographed by the photographing device 120. Subsequently, a projected area identified by the coordinate information after the projection (an area identified based on the center position information, the radius information (R), and the spherical shape information) is determined as the specific area.

(6) Pattern 6

Figure 11:
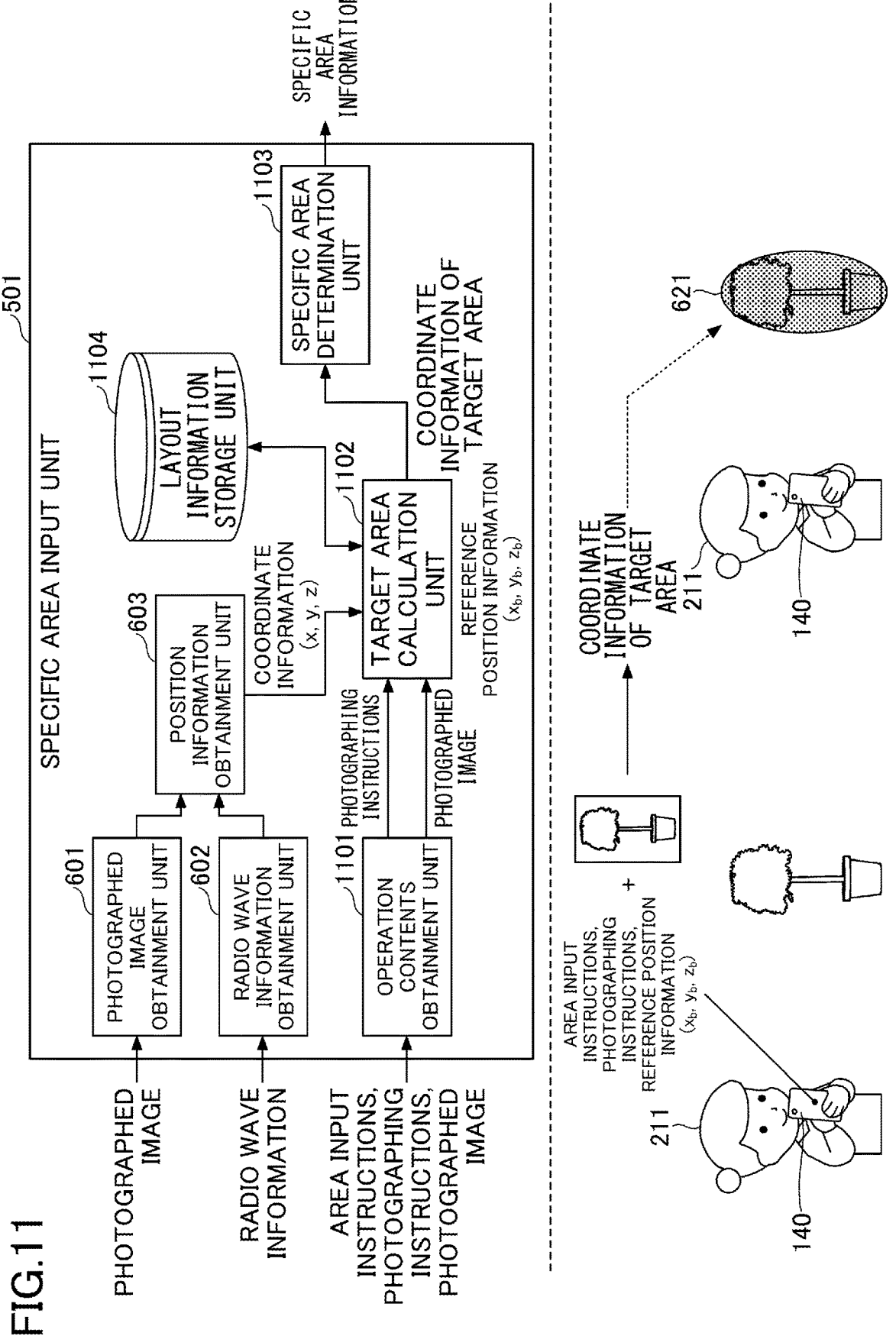
FIG. 11 is a sixth representation illustrating the functional configuration of the specific area input unit and a specific example of the specific area determination process.

FIG. 11 is a sixth representation illustrating the functional configuration of the specific area input unit and a specific example of the specific area determination process. As illustrated in FIG. 11, the specific area input unit 501 includes the photographed image obtainment unit 601, the radio wave information obtainment unit 602, the position information obtainment unit 603, the operation contents obtainment unit 1101, a target area calculation unit 1102, and a specific area determination unit 1103.

Of these, the photographed image obtainment unit 601 to the position information obtainment unit 603 have already been described with reference to FIG. 6, and thus, description thereof will be omitted here.

The operation contents obtainment unit 1101 obtains operation contents transmitted from the user terminal 140. The example of FIG. 11 illustrates a situation in which the operation contents are as follows; i.e., the "area input" button has been pressed first and the "target photographing" button has been pressed second.

The operation contents obtainment unit 1101 obtains area input instructions in response to pressing of the "area input" button. Also, the operation contents obtainment unit 1101 obtains photographing instructions in response to pressing of a shutter button (not illustrated) after the user terminal 140 has started photographing in response to pressing of the "target photographing" button, and notifies the target area calculation unit 1102 of the obtained photographing instructions. Note that, when the target area calculation unit 1102 has been notified of the photographing instructions from the operation contents obtainment unit 1101, the target area calculation unit 1102 maintains the coordinate information notified from the position information obtainment unit 603. The position coordinate maintained at this time becomes reference position information $(x_b, y_b, z_b)$ that is used for calculating coordinate information of the target area and is coordinate information of the user terminal 140 upon photographing.

Also, when the operation contents obtainment unit 1101 has obtained the photographed image from the user terminal 140 in response to pressing of the shutter button (not illustrated), the operation contents obtainment unit 1101 notifies the target area calculation unit 1102 of the obtained photographed image.

The target area calculation unit 1102 identifies the target included in the photographed image based on the reference position information ($x_b$, $y_b$, $z_b$) and calculates coordinate information of the area of the target (target area) in the real space 210.

Note that, the target area calculation unit 1102 refers to a layout information storage unit 1104 for identifying the target included in the photographed image based on the reference position information ($x_b$, $y_b$, $z_b$). The layout information storage unit 1104 previously stores layout information in which objects' names of objects disposed in the real space 210 (e.g., house plants and chairs) and coordinate information of objects' areas (shape data such as three-dimensional data) are associated with each other.

Therefore, the target area calculation unit 1102 identifies, from the layout information, the object's name that corresponds to the object included in the photographed image and is associated with the coordinate information in the vicinity of the reference position information ($x_b$, $y_b$, $z_b$). The target area calculation unit 1102 notifies the specific area determination unit 1103 of the coordinate information of the object's area associated with the identified object's name as coordinate information of the area of the photographed target (target area).

The specific area determination unit 1103 determines, as the specific area 621, the coordinate information of the target area notified from the target area calculation unit 1102.

<Functional Configuration of the Specific Area Input Unit and Specific Example of the Specific Area Deletion Process>

Next, details of the functional configuration of the specific area input unit 501 (here, a functional configuration in relation to deletion of the specific area) and a specific example of the specific area deletion process will be described.

Figure 12:
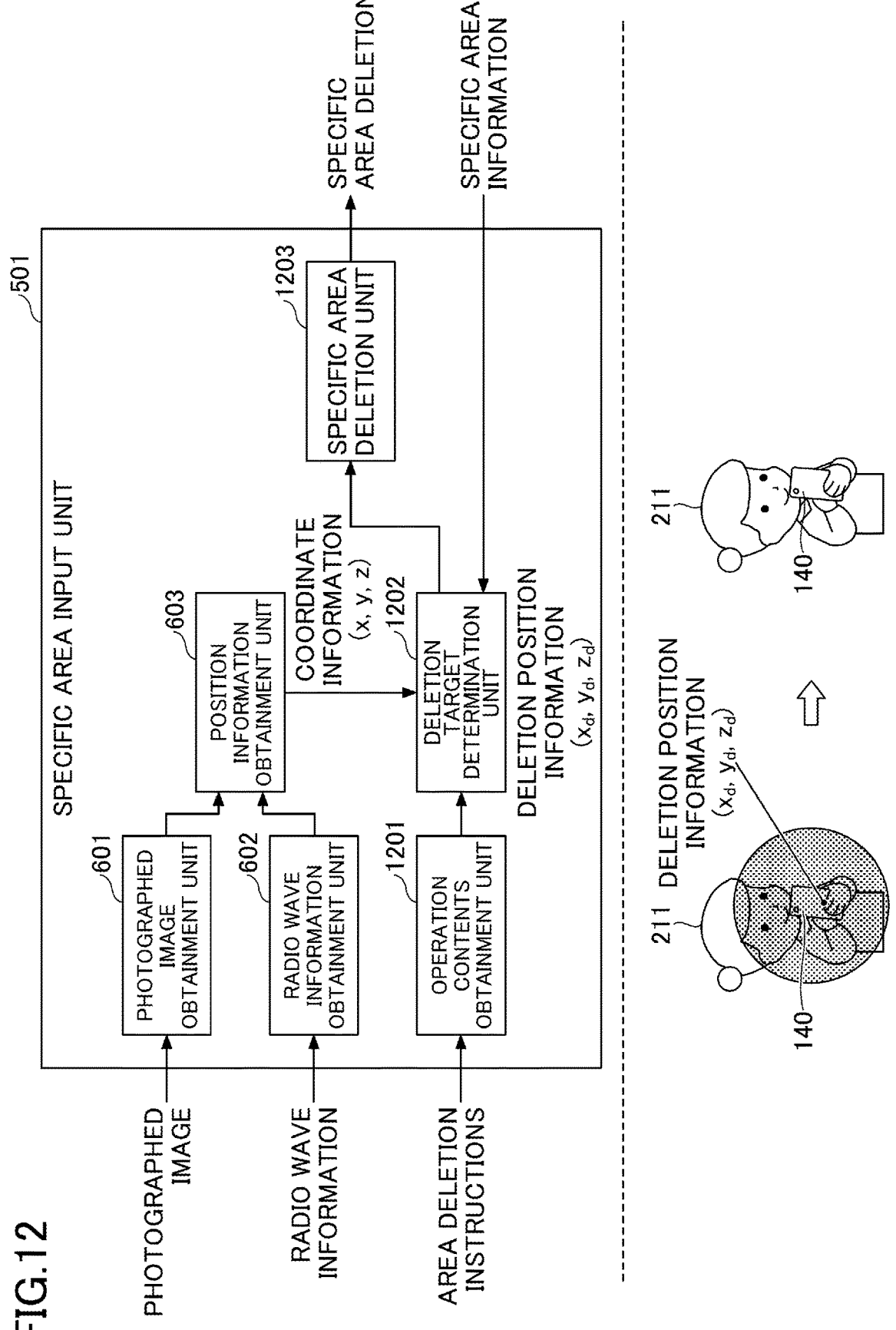
FIG. 12 is a representation illustrating the functional configuration of the specific area input unit and a specific example of a specific area deletion process.

FIG. 12 is a representation illustrating the functional configuration of the specific area input unit and a specific example of the specific area deletion process. As illustrated in FIG. 12, the specific area input unit 501 includes the photographed image obtainment unit 601, the radio wave information obtainment unit 602, the position information obtainment unit 603, an operation contents obtainment unit 1201, a deletion target determination unit 1202, and a specific area deletion unit 1203.

Of these, the photographed image obtainment unit 601 to the position information obtainment unit 603 have already been described with reference to FIG. 6, and thus, description thereof will be omitted here. In the case of FIG. 12, the position information obtainment unit 603 notifies the deletion target determination unit 1202 of the calculated coordinate information.

The operation contents obtainment unit 1201 obtains operation contents transmitted from the user terminal 140, and notifies the deletion target determination unit 1202 of the obtained operation contents. The example of FIG. 12 illustrates a situation in which the operation contents are as follows; i.e., area deletion instructions have been notified in response to pressing of the "area deletion" button.

When the deletion target determination unit 1202 has been notified of the area deletion instructions from the operation contents obtainment unit 1201, the deletion target determination unit 1202 maintains the coordinate information, which has been notified from the position information obtainment unit 603, as deletion position information ($x_d$, $y_d$, $z_d$) used for determining the specific area to be deleted.

Also, the deletion target determination unit 1202 reads out the specific area information that has already been registered in the air conditioning control unit 502, and determines the specific area including the deletion position information ($x_d$, $y_d$, $z_d$). Furthermore, the deletion target determination unit 1202 notifies the specific area deletion unit 1203 of the determined specific area as the specific area to be deleted.

The specific area deletion unit 1203 deletes the specific area, which has been notified from the deletion target determination unit 1202, from the specific area information that has already been registered in the air conditioning control unit 502.

In this way, the specific area deletion unit 1203 deletes the specific area to be deleted, in response to pressing of the "area deletion" button with the user terminal 140 being positioned in the specific area to be deleted.

<Functional Configuration of the Specific Area Input Unit and Specific Example of the Specific Area Movement Process>

Next, details of the functional configuration of the specific area input unit 501 (here, a functional configuration in relation to movement of the specific area) and a specific example of the specific area movement process will be described.

Figure 13:
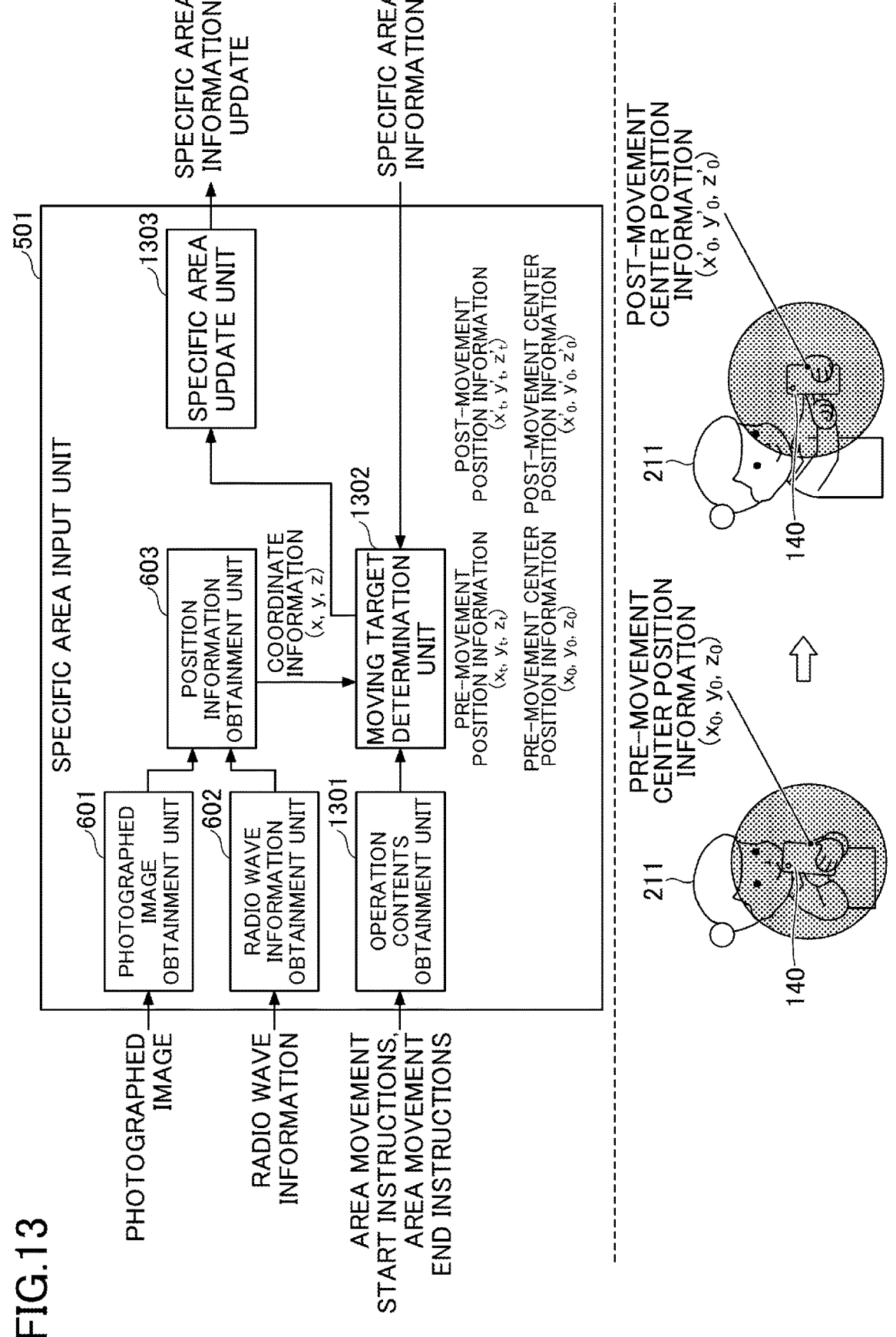
FIG. 13 is a representation illustrating the functional configuration of the specific area input unit and a specific example of a specific area movement process.

FIG. 13 is a representation illustrating the functional configuration of the specific area input unit and a specific example of the specific area movement process. As illustrated in FIG. 13, the specific area input unit 501 includes the photographed image obtainment unit 601, the radio wave information obtainment unit 602, the position information obtainment unit 603, an operation contents obtainment unit 1301, a moving target determination unit 1302, and a specific area update unit 1303.

Of these, the photographed image obtainment unit 601 to the position information obtainment unit 603 have already been described with reference to FIG. 6, and thus, description thereof will be omitted here. In the case of FIG. 13, however, the position information obtainment unit 603 notifies the moving target determination unit 1302 of the calculated coordinate information.

The operation contents obtainment unit 1301 obtains operation contents transmitted from the user terminal 140, and notifies the moving target determination unit 1302 of the obtained operation contents. The example of FIG. 13 illustrates a situation in which the operation contents are as follows; i.e., area movement start instructions and area movement end instructions have been notified in response to pressing of the "area movement" button.

When the moving target determination unit 1302 has been notified of the area movement start instructions from the operation contents obtainment unit 1301, the moving target determination unit 1302 maintains the coordinate information, which has been notified from the position information obtainment unit 603, as pre-movement position information ($x_t$, $y_t$, $z_t$).

Also, the moving target determination unit 1302 reads out the specific area information that has already been registered in the air conditioning control unit 502, and determines the specific area including the pre-movement position information ($x_t$, $y_t$, $z_t$). Furthermore, the moving target determination unit 1302 obtains pre-movement center position information $(x_0, y_0, z_0)$ that is the center position information of the determined specific area.

Also, when the moving target determination unit 1302 has been notified of the area movement end instructions from the operation contents obtainment unit 1301 after the movement operation of the user terminal 140, the moving target determination unit 1302 maintains the coordinate information notified from the position information obtainment unit 603, as the post-movement position information $(x'_t, y'_t, z'_t)$.

Also, the moving target determination unit 1302 adds, to the pre-movement center position information $(x_0, y_0, z_0)$, the difference between the pre-movement position information $(x_t, y_t, z_t)$ and the post-movement position information $(x'_t, y'_t, z'_t)$. Thereby, the moving target determination unit 1302 calculates post-movement center position information $(x'_0, Y'_0, z'_0)$.

Furthermore, the moving target determination unit 1302 notifies the specific area update unit 1303 of the calculated post-movement center position information $(x'_0, y'_0, z'_0)$.

The specific area update unit 1303 updates the corresponding specific area information, which has already been registered in the air conditioning control unit 502, based on the post-movement center position information $(x'_0, y'_0, z'_0)$ notified from the moving target determination unit 1302.

In this way, the specific area update unit 1303 moves the specific area to be moved, in response to pressing of the "area movement" button followed by the movement operation, with the user terminal 140 being positioned in the specific area to be moved.

<Functional Configuration of the Specific Area Input Unit and Specific Example of the Operation Information Input Process>

Next, details of the functional configuration of the specific area input unit 501 (here, a functional configuration in relation to input of the operation information) and a specific example of the operation information input process will be described.

Figure 14:
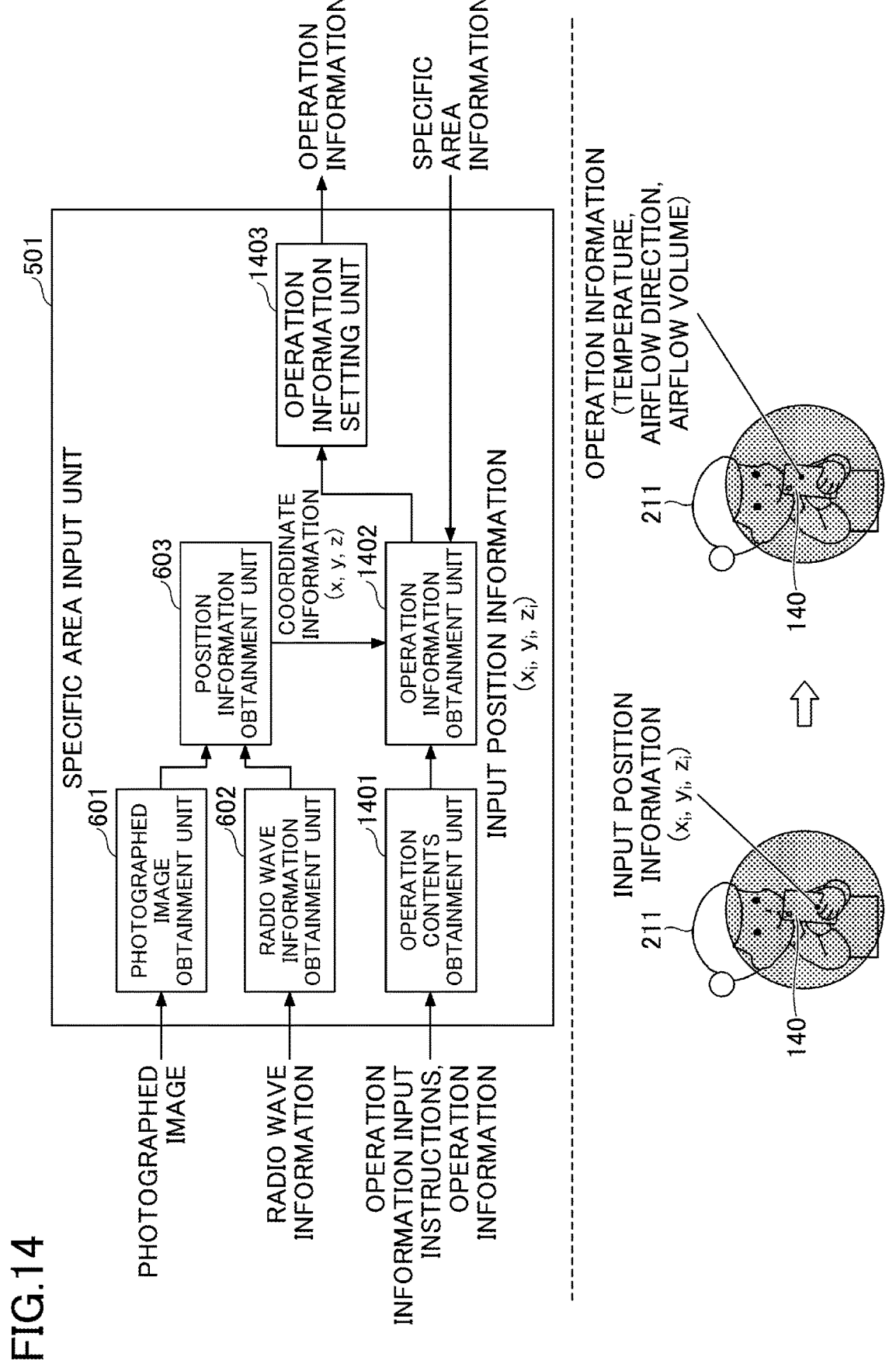
FIG. 14 is a representation illustrating the functional configuration of the specific area input unit and a specific example of an operation information input process.

FIG. 14 is a representation illustrating the functional configuration of the specific area input unit and a specific example of the operation information input process. As illustrated in FIG. 14, the specific area input unit 501 includes the photographed image obtainment unit 601, the radio wave information obtainment unit 602, the position information obtainment unit 603, an operation contents obtainment unit 1401, an operation information obtainment unit 1402, and an operation information setting unit 1403.

Of these, the photographed image obtainment unit 601 to the position information obtainment unit 603 have already been described with reference to FIG. 6, and thus, description thereof will be omitted here. In the case of FIG. 14, however, the position information obtainment unit 603 notifies the operation information obtainment unit 1402 of the calculated coordinate information.

The operation contents obtainment unit 1401 obtains operation contents transmitted from the user terminal 140, and notifies the operation information obtainment unit 1402 of the obtained operation contents. The example of FIG. 14 illustrates a situation in which the operation contents are as follows; i.e., operation information input instructions have been notified in response to pressing of the "operation information input" button 415. Furthermore, the example of FIG. 14 illustrates a situation in which the operation contents are as follows; i.e., operation information has been notified in response to input of the operation information.

When the operation information obtainment unit 1402 has been notified of the operation information input instructions from the operation contents obtainment unit 1401, the operation information obtainment unit 1402 maintains the coordinate information, which has been notified from the position information obtainment unit 603, as input position information $(x_i, y_i, z_i)$.

Also, the operation information obtainment unit 1402 reads out the specific area information that has already been registered in the air conditioning control unit 502, and determines the specific area including the input position information $(x_i, y_i, z_i)$. Furthermore, the operation information obtainment unit 1402 notifies the operation information setting unit 1403 of the determined specific area together with the notified operation information.

The operation information setting unit 1403 registers the operation information, which has been notified from the operation information obtainment unit 1402, as the notified operation information of the specific area in association with the specific area.

In this way, the operation information setting unit 1403 registers operation information in association with the specific area when the operation information has been input in response to pressing of the "operation information input" button, with the user terminal 140 being positioned in the specific area whose operation information is intended to be registered.

<Functional Configuration of the Specific Area Input Unit and Specific Example of the Operation Information Reverse Process>

Figure 15:
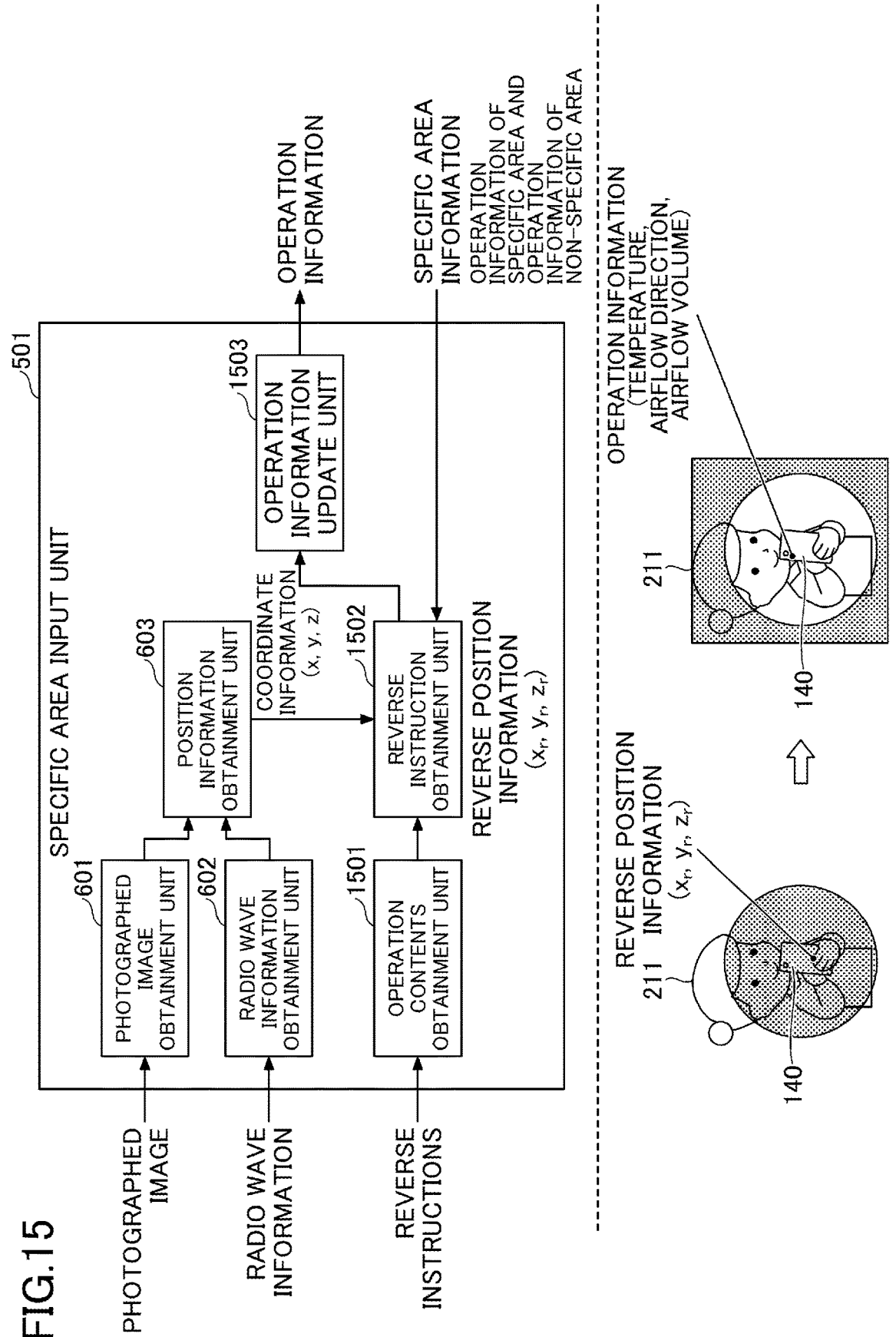
FIG. 15 is a representation illustrating the functional configuration of the specific area input unit and a specific example of an operation information reverse process.

Next, details of the functional configuration of the specific area input unit 501 (here, a functional configuration in relation to reverse of the operation information) and a specific example of the operation information reverse process will be described. FIG. 15 is a representation illustrating the functional configuration of the specific area input unit and a specific example of the operation information reverse process. As illustrated in FIG. 15, the specific area input unit 501 includes the photographed image obtainment unit 601, the radio wave information obtainment unit 602, the position information obtainment unit 603, an operation contents obtainment unit 1501, a reverse instruction obtainment unit 1502, and an operation information update unit 1503.

Of these, the photographed image obtainment unit 601 to the position information obtainment unit 603 have already been described with reference to FIG. 6, and thus, description thereof will be omitted. In the case of FIG. 15, however, the position information obtainment unit 603 notifies the reverse instruction obtainment unit 1502 of the calculated coordinate information.

The operation contents obtainment unit 1501 obtains operation contents transmitted from the user terminal 140, and notifies the reverse instruction obtainment unit 1502 of the obtained operation contents. The example of FIG. 15 illustrates a situation in which the operation contents are as follows; i.e., reverse instructions have been notified in response to pressing of the "reverse" button.

When the reverse instruction obtainment unit 1502 has been notified of the reverse instructions from the operation contents obtainment unit 1501, the reverse instruction obtainment unit 1502 maintains the coordinate information, which has been notified from the position information obtainment unit 603, as reverse position information $(x_r, y_r, z_r)$.

Also, the reverse instruction obtainment unit 1502 reads out the specific area information that has already been registered in the air conditioning control unit 502, and determines the specific area including the reverse position information $(x_r, y_r, z_r)$. Furthermore, the reverse instruction obtainment unit 1502 reads out the operation information associated with the determined specific area and the operation information associated with the non-specific area, and notifies the operation information update unit 1503 of the operation information.

The operation information update unit 1503 switches between the operation information associated with the specific area and the operation information associated with the non-specific area that have been notified from the reverse instruction obtainment unit 1502, and registers the operation information after the reversing in the air conditioning control unit 502.

In this way, the operation information update unit 1503 exchanges the operation information of the specific area with the operation information of the non-specific area in response to pressing of the "reverse" button with the user terminal 140 being positioned in the specific area whose operation information is intended to be reversed.

<Functional Configuration of the Specific Area Output Unit and Specific Example of the Specific Area Display Process>

Figure 16:
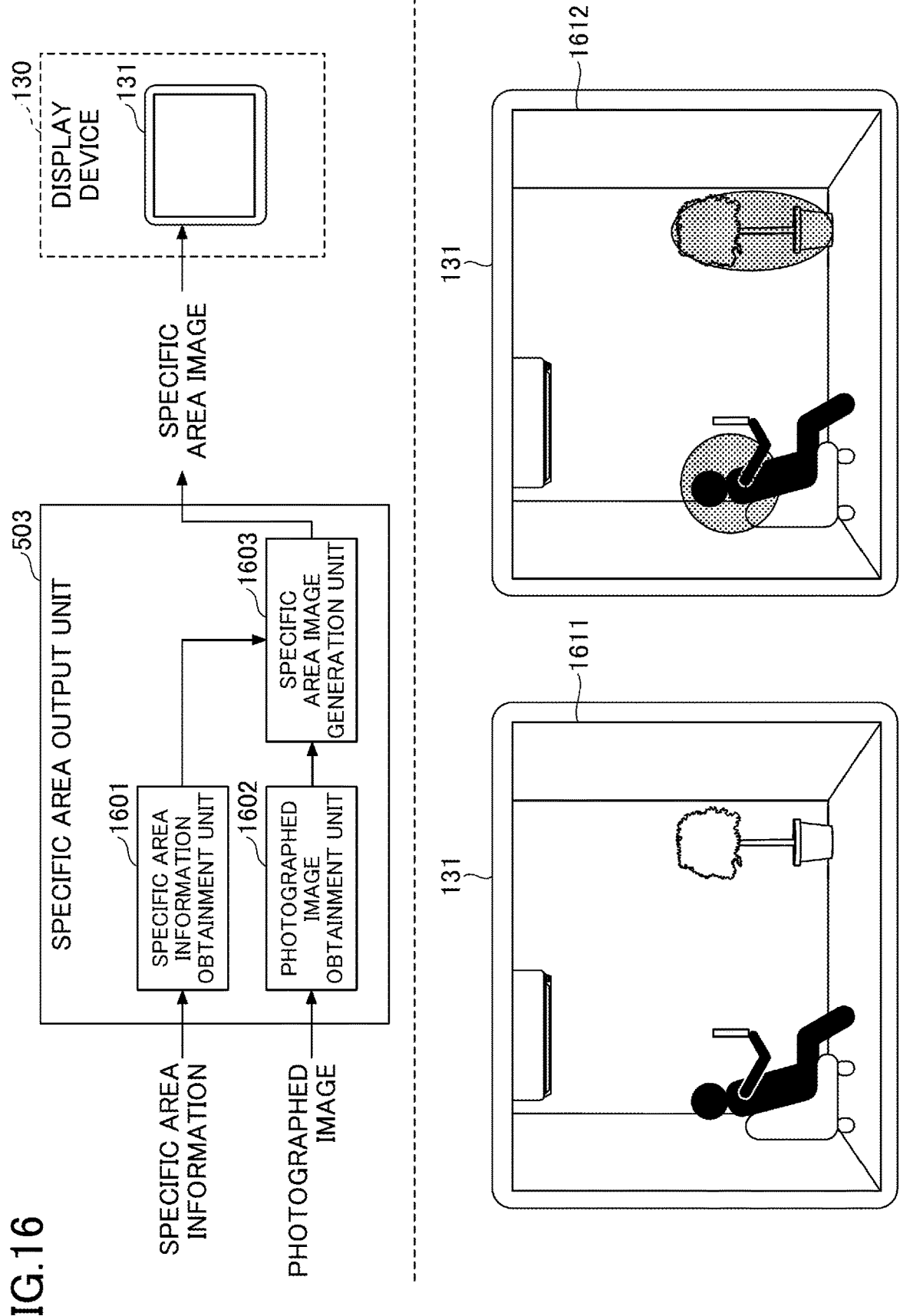
FIG. 16 is a first view illustrating a functional configuration of a specific area output unit and a specific example of a specific area output process.

Next, details of the functional configuration of the specific area output unit 503 (here, a functional configuration in relation to display of the specific area) and a specific example of the specific area display process will be described. FIG. 16 is a first view illustrating the functional configuration of the specific area output unit and a specific example of the specific area output process. As illustrated in FIG. 16, the specific area output unit 503 includes a specific area information obtainment unit 1601, a photographed image obtainment unit 1602, and a specific area image generation unit 1603.

The specific area information obtainment unit 1601 reads out the specific area information that has already been registered in the air conditioning control unit 502, and notifies the specific area image generation unit 1603 of the specific area information.

The photographed image obtainment unit 1602 obtains the photographed image photographed by the photographing device 120, and notifies the specific area image generation unit 1603 of the obtained photographed image.

The specific area image generation unit 1603 generates a specific area-indicating image based on the specific area information notified from the specific area information obtainment unit 1601. Also, the specific area image generation unit 1603 generates a specific area image by superimposing the generated specific area-indicating image onto a position, in accordance with the specific area information, on the photographed image notified from the photographed image obtainment unit 1602.

Also, the specific area image generation unit 1603 transmits the photographed image or the generated specific area image to the monitor 131, thereby displaying the photographed image or the specific area image on the monitor 131.

The example of FIG. 16 illustrates a situation in which the photographed image 1611 is displayed on the monitor 131 and a situation in which the specific area image 1612 is displayed on the monitor 131.

<Flow of the Specific Area Registration Process in the Specific Operation Mode>

Figure 17:
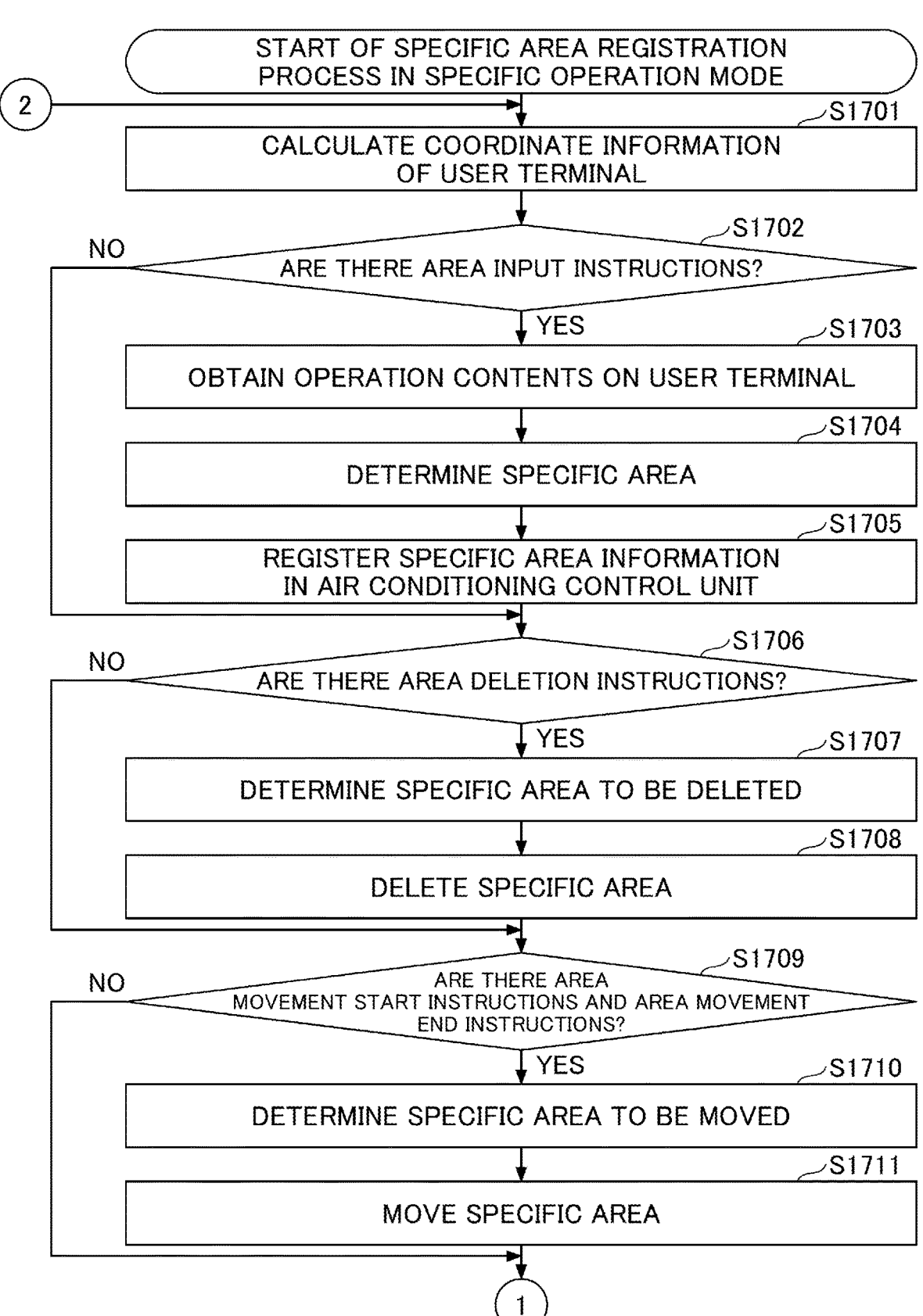
FIG. 17 is a first flowchart illustrating a flow of a specific area registration process in a specific operation mode.
Figure 18:
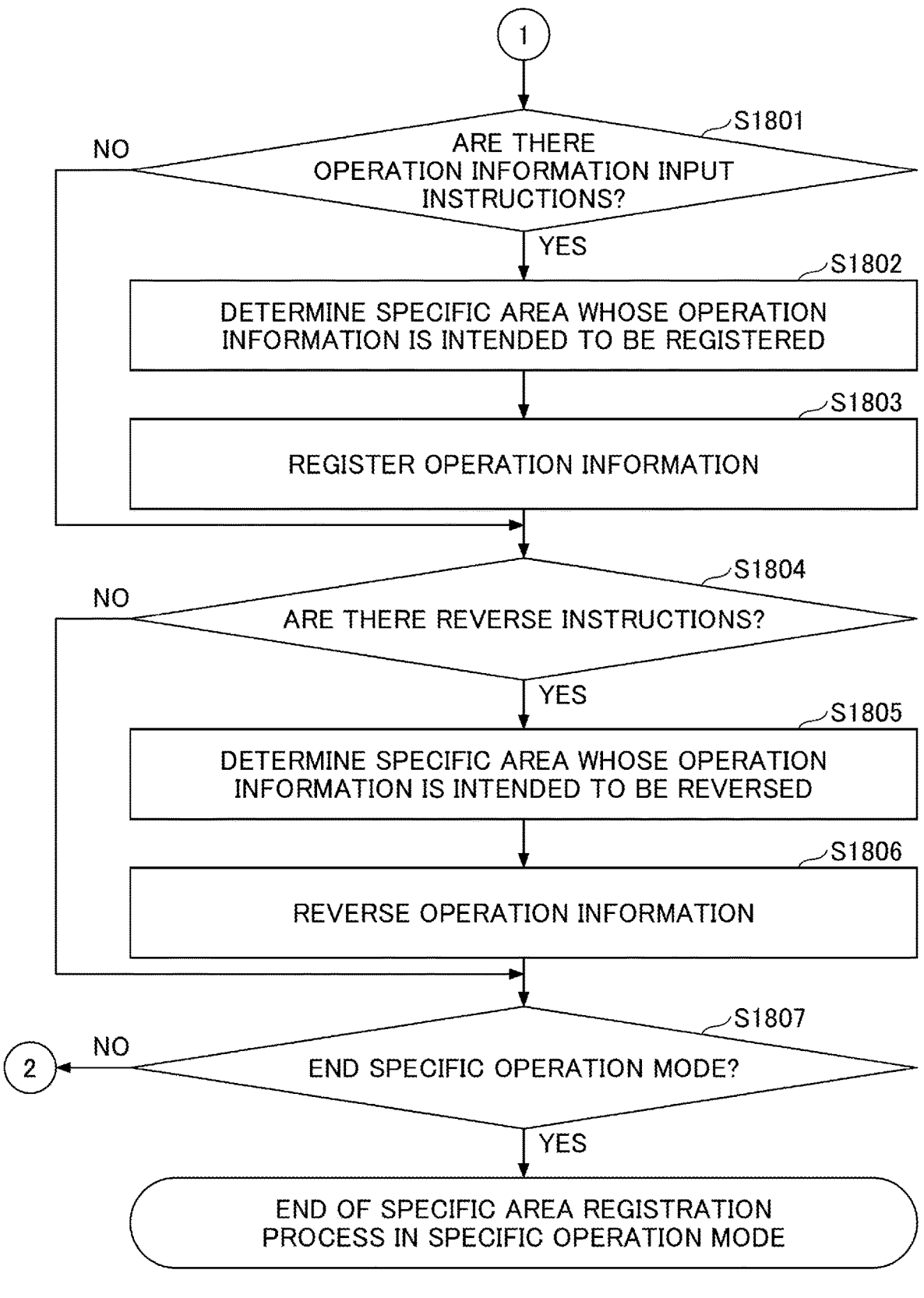
FIG. 18 is a second flowchart illustrating a flow of a specific area registration process in a specific operation mode.

Next, a flow of the specific area registration process of the air conditioning system 100 in the specific operation mode will be described. FIG. 17 and FIG. 18 are first and second flowcharts each illustrating the flow of the specific area registration process in the specific operation mode.

In step S1701, the specific area input unit 501 calculates the coordinate information of the user terminal 140.

In step S1702, the specific area input unit 501 determines whether the area input instructions have been obtained. In step S1702, when the specific area input unit 501 determines that the area input instructions have not been obtained (in the case of "NO" in step S1702), the flow proceeds to step S1706.

Meanwhile, in step S1702, when the specific area input unit 501 determines that the area input instructions have been obtained (in the case of "YES" in step S1702), the flow proceeds to step S1703.

In step S1703, the specific area input unit 501 obtains the operation contents of the user terminal 140.

In step S1704, the specific area input unit 501 determines the specific area based on the coordinate information of the user terminal 140 and based on the operation contents of the user terminal 140, and generates specific area information.

In step S1705, the specific area input unit 501 registers the generated specific area information in the air conditioning control unit 502.

In step S1706, the specific area input unit 501 determines whether the area deletion instructions have been obtained. In step S1706, when the specific area input unit 501 determines that the area deletion instructions have not been obtained (in the case of "NO" in step S1706), the flow proceeds to step S1709.

Meanwhile, in step S1706, when the specific area input unit 501 determines that the area deletion instructions have been obtained (in the case of "YES" in step S1706), the flow proceeds to step S1707.

In step S1707, the specific area input unit 501 determines the specific area to be deleted, based on the coordinate information of the user terminal 140.

In step S1708, the specific area input unit 501 deletes the specific area information of the determined specific area.

In step S1709, the specific area input unit 501 determines whether the area movement start instructions and the area movement end instructions have been obtained. In step S1709, when the specific area input unit 501 determines that the area movement start instructions and the area movement end instructions have not been obtained (in the case of "NO" in step S1709), the flow proceeds to step S1801 in FIG. 18.

Meanwhile, in step S1709, when the specific area input unit 501 determines that the area movement start instructions and the area movement end instructions have been obtained (in the case of "YES" in step S1709), the flow proceeds to step S1710.

In step S1710, the specific area input unit 501 determines the specific area to be moved, based on the coordinate information of the user terminal 140.

In step S1711, the specific area input unit 501 moves the determined specific area, and registers the specific area information of the specific area after the movement.

In step S1801, the specific area input unit 501 determines whether the operation information input instructions have been obtained. In step S1801, when the specific area input unit 501 determines that the operation information input instructions have not been obtained (in the case of "NO" in step S1801), the flow proceeds to step S1804.

Meanwhile, in step S1801, when the specific area input unit 501 determines that the operation information input instructions have been obtained (in the case of "YES" in step S1801), the flow proceeds to step S1802.

In step S1802, the specific area input unit 501 determines, based on the coordinate information of the user terminal 140, the specific area whose operation information is intended to be registered.

In step S1803, the specific area input unit 501 registers the operation information in association with the determined specific area.

In step S1804, the specific area input unit 501 determines whether the reverse instructions have been obtained. In step S1804, when the specific area input unit 501 determines that the reverse instructions have not been obtained (in the case of "NO" in step S1804), the flow proceeds to step S1807.

Meanwhile, in step S1804, when the specific area input unit 501 determines that the reverse instructions have been obtained (in the case of "YES" in step S1804), the flow proceeds to S1805.

In step S1805, the specific area input unit 501 determines, based on the coordinate information of the user terminal 140, the specific area whose operation information is intended to be reversed.

In step S1806, the specific area input unit 501 reverses between the operation information associated with the determined specific area and the operation information associated with the non-specific area, and registers the operation information after the reverse.

In step S1807, the specific area input unit 501 determines whether to end the specific operation mode. In step S1807, when the specific area input unit 501 determines continuation of the specific operation mode (in the case of "NO" in step S1807), the flow returns to step S1701 in FIG. 17.

Meanwhile, in step S1807, when the specific area input unit 501 determines ending of the specific operation mode (in the case of "YES" in step S1807), the specific area registration process in the specific operation mode ends.

Operation Example of the Air Conditioning System

Figure 19:
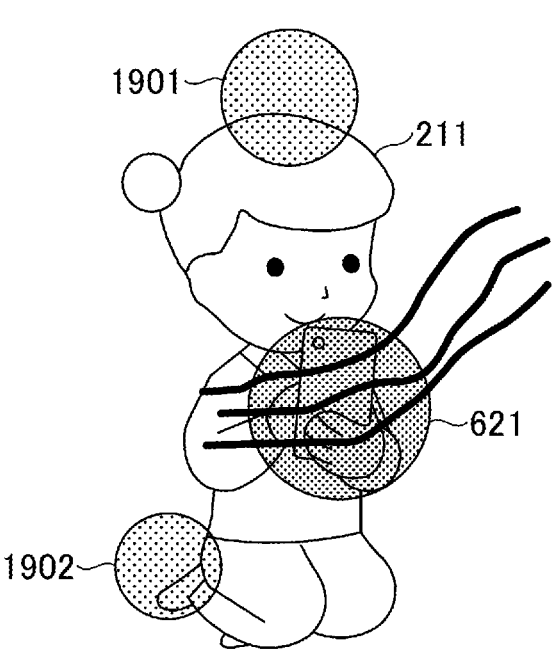
FIG. 19 is a view illustrating one example of air conditioning control by the air conditioning system.

Next, an operation example of the air conditioning system 100 will be described. FIG. 19 is a view illustrating one example of the air conditioning control by the air conditioning system. The example of FIG. 19 illustrates a situation in which the operation information has been registered so that air to be fed hits the specific area 621 while the operation information has been registered so that air to be fed does not hit the specific areas 1901 and 1902.

In this way, according to the air conditioning system 100 according to the first embodiment, it is possible for the user 211 to freely change the size and the shape of the specific area to be controlled, and is also possible to register a plurality of specific areas for one user 211.

SUMMARY

As is clear from the above description, the air conditioning system 100 according to the first embodiment includes
the air conditioning device and the user terminal that are capable of air conditioning control for the specific area in the real space, and registers
the specific area determined based on the position information of the user terminal in the real space and based on the operation contents of the user terminal.

Thereby, according to the first embodiment, it is possible to provide the air conditioning system and the registration program that can register the specific area to be controlled in the real space.

Second Embodiment

In the first embodiment, the specific area output unit is realized in the control device of the air conditioning device

110. However, the specific area output unit may be realized in, for example, the user terminal 140. Hereinafter, the second embodiment will be described, focusing on the difference from the first embodiment.

<Functional Configurations of the Control Device and the User Terminal>

First, the functional configuration of the control device of the air conditioning device 110 and the functional configuration of the user terminal 140 in the air conditioning system according to the second embodiment will be described.

Figure 20:
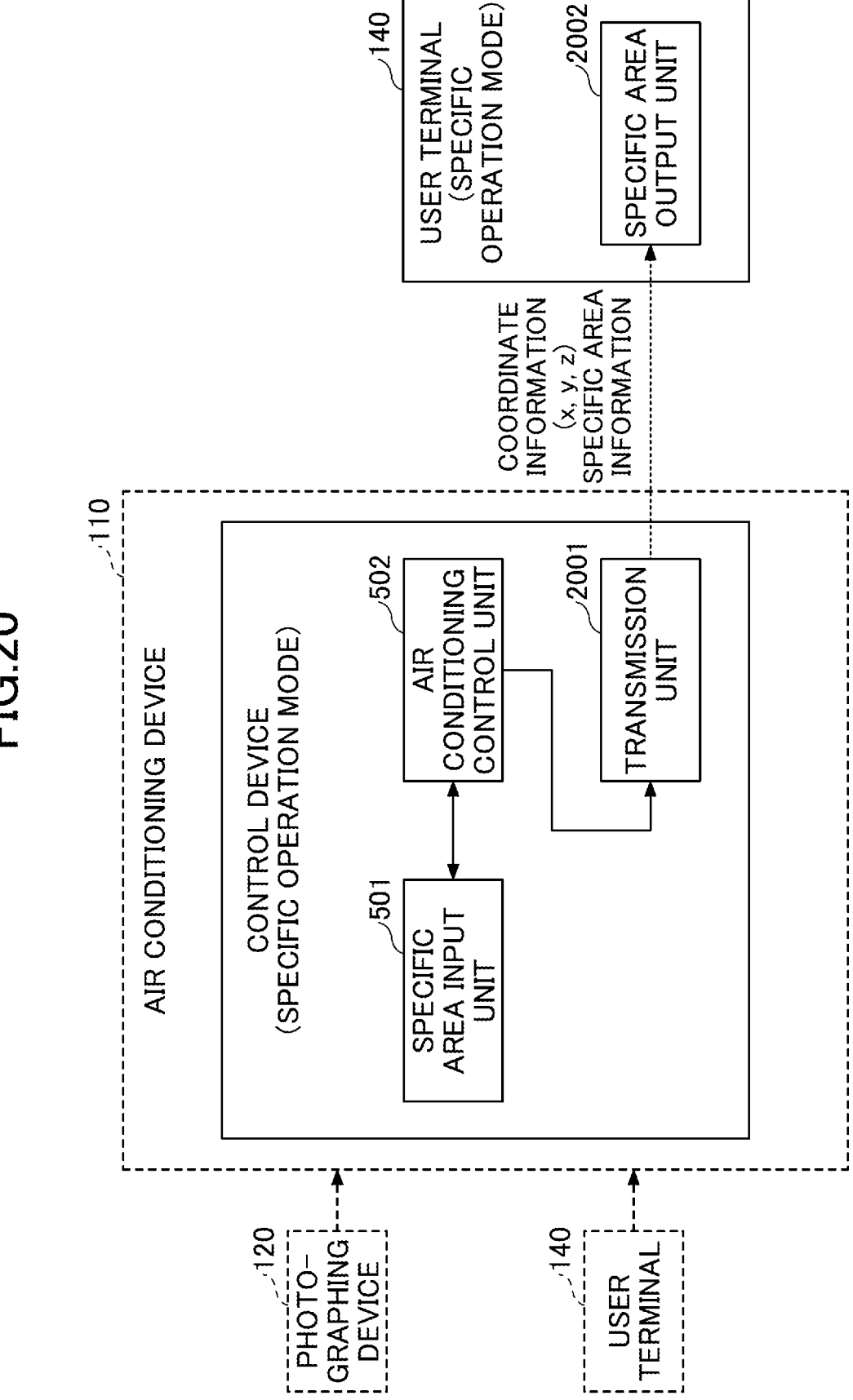
FIG. 20 is a view illustrating one example of functional configurations of the control device in the specific operation mode and the user terminal.

FIG. 20 is a view illustrating one example of the functional configurations of the control device in the specific operation mode and the user terminal. As illustrated in FIG. 20, in the second embodiment, the control device of the air conditioning device 110 functions as the specific area input unit 501, the air conditioning control unit 502, and a transmission unit 2001 by executing the registration program.

Of these, the specific area input unit 501 and the air conditioning control unit 502 have already been described with reference to FIG. 5 in the first embodiment, and thus, description thereof will be omitted here.

The transmission unit 2001 transmits, to the user terminal 140, various information for notifying the users 211, 221, 222, etc. of the specific area registered by the air conditioning control unit 502.

Meanwhile, in the second embodiment, the user terminal 140 functions as a specific area output unit 2002 by executing the air conditioning operation program.

The specific area output unit 2002 performs a process to notify the users 211, 221, 222, etc. of the specific area based on the various information transmitted from the transmission unit 2001.

<Functional Configurations of the Transmission Unit and the Specific Area Output Unit, and Specific Example of the Specific Area Output Process>

Figure 21:
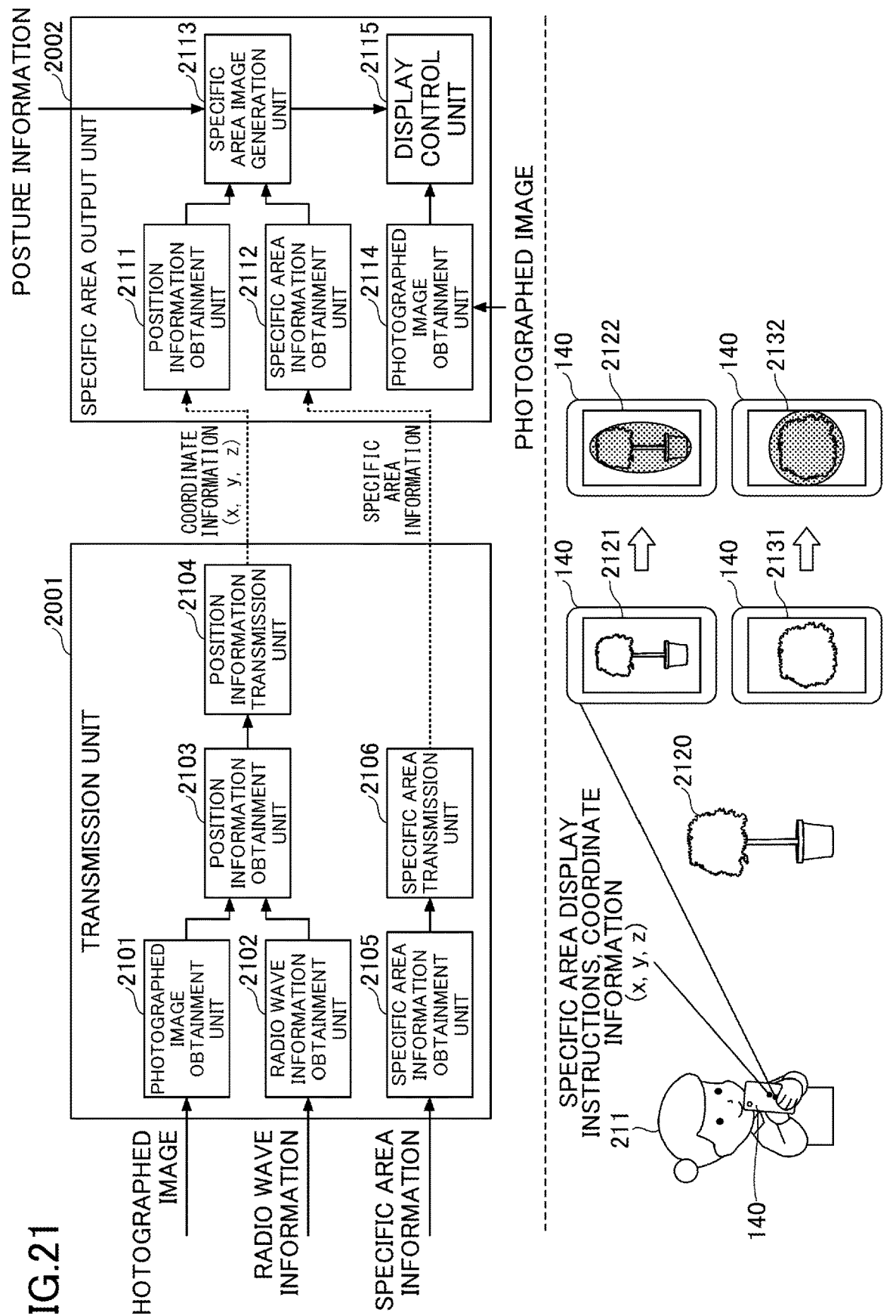
FIG. 21 is a view illustrating functional configurations of a transmission unit and a specific area output unit, and a specific example of a specific area display process.

Next, details of the functional configurations of the transmission unit 2001 and the specific area output unit 2002 (here, functional configurations in relation to the specific area output process) and a specific example of the specific area output process will be described. FIG. 21 is a view illustrating functional configurations of the transmission unit and the specific area output unit, and a specific example of the specific area output process.

As illustrated in FIG. 21, the transmission unit 2001 includes a photographed image obtainment unit 2101, a radio wave information obtainment unit 2102, a position information obtainment unit 2103, a position information transmission unit 2104, a specific area information obtainment unit 2105, and a specific area transmission unit 2106.

The photographed image obtainment unit 2101 obtains the photographed image photographed by the photographing device 120, and notifies the position information obtainment unit 2103 of the obtained photographed image.

The radio wave information obtainment unit 2102 obtains the radio wave information received by the radio wave transceiver device 310, and notifies the position information obtainment unit 2103 of the obtained radio wave information.

The position information obtainment unit 2103 calculates the coordinate information (x,y, z) indicating the position of the user terminal 140 in the real space 210 or 220 based on the notified photographed image and radio wave information.

The position information transmission unit 2104 transmits, to the specific area output unit 2002 of the user terminal 140, the coordinate information (x,y, z) calculated by the position information obtainment unit 2103.

The specific area information obtainment unit 2105 reads out the specific area information registered in the air conditioning control unit 502, and notifies the specific area transmission unit 2106 of the read-out specific area information.

The specific area transmission unit 2106 transmits, to the specific area output unit 2002, the specific area information notified from the specific area information obtainment unit 2105.

Meanwhile, the specific area output unit 2002 includes a position information obtainment unit 2111, a specific area information obtainment unit 2112, a specific area image generation unit 2113, a photographed image obtainment unit 2114, and a display control unit 2115.

The position information obtainment unit 2111 obtains the coordinate information (x,y, z) transmitted from the position information transmission unit 2104, and notifies the specific area image generation unit 2113 of the obtained coordinate information.

The specific area information obtainment unit 2112 obtains the specific area information transmitted from the specific area transmission unit 2106, and notifies the specific area image generation unit 2113 of the obtained specific area information.

The specific area image generation unit 2113 identifies the current position of the user terminal 140 in the real space based on the coordinate information (x,y, z) notified from the position information obtainment unit 2111. Also, the specific area image generation unit 2113 identifies which direction the user terminal 140 currently faces toward (posture of the user terminal 140) based on the output from the acceleration sensor 328. Also, the specific area image generation unit 2113 calculates, from the identified position and direction (coordinate information and posture information), coordinate information of respective positions in a photographed area when the photographing device 327 of the user terminal 140 performs photographing. Furthermore, the specific area image generation unit 2113 fits, to the coordinate information of the respective positions in the photographed area, the specific area information notified from the specific area information obtainment unit 2112.

Thereby, the specific area information obtainment unit 2112 can generate an image of the specific area at a position in the photographed image when the photographing device 327 of the user terminal 140 starts photographing, the image facing in accordance with the direction in which the user terminal 140 faces. Note that, the specific area image generation unit 2113 notifies the display control unit 2115 of the generated specific area image (a three-dimensional image).

The photographed image obtainment unit 2114 obtains the photographed image photographed by the photographing device 327 when the photographing device 327 starts photographing after receiving specific area display instructions in response to pressing of the "specific area display" button 414 on the operation screen 400 of the user terminal 140. Also, the photographed image obtainment unit 2114 notifies the display control unit 2115 of the obtained photographed image.

The display control unit 2115 generates a display image by superimposing, on the photographed image notified from the photographed image obtainment unit 2114, the specific area image notified from the specific area image generation unit 2113. Also, the display control unit 2115 displays the generated display image on a display screen of the display device 326 of the user terminal 140.

The example of FIG. 21 illustrates a situation in which the user 211 presses the "specific area display" button 414 on the operation screen 400 of the user terminal 140 at a position identified by the coordinate information (x,y, z), thereby giving the specific area display instructions to start photographing.

Also, the example of FIG. 21 illustrates a case in which the specific area information has been registered for a house plant 2120 disposed in the real space 210. In this case, the display screen of the display device 326 of the user terminal 140 displays, for example, a display image 2122 in which the specific area image is superimposed on a photographed image 2121 obtained by photographing the house plant 2120 from directly laterally.

Also, the display screen of the display device 326 of the user terminal 140 displays, for example, a display image 2132 in which the specific area image is superimposed on a photographed image 2131 obtained by photographing the house plant 2120 from directly above.

In this way, by visualizing the registered specific area in the real space 210 using a function of augmented reality of the user terminal 140, the user 211 can know, via the user terminal 140, which position in the real space 210 has been registered as the specific area.

SUMMARY

As is clear from the above description, the air conditioning system 100 according to the second embodiment includes, in addition to the functions described in the first embodiment, the function of displaying an image in which the specific area-indicating three-dimensional image is superimposed on the photographed image photographed by performing a photographing operation on the user terminal, the specific area-indicating three-dimensional image being generated based on the position information and the posture information of the user terminal in the real space.

Thereby, according to the second embodiment, it is possible to obtain similar effects to those of the first embodiment, and the user can come to know the registered specific area via the user terminal 140.

Third Embodiment

In the second embodiment, the display image, in which the specific area image is superimposed on the photographed image photographed by the photographing device 327 of the user terminal 140, is displayed on the display screen of the user terminal 140, thereby notifying the user of the registered specific area information.

However, a notification method of notifying the user of the specific area information is not limited thereto. For example, by outputting a predetermined stimulus (sound, light, or vibration), the user may be notified of whether the user terminal 140 is positioned in the specific area in the real space or positioned outside of the specific area (in the non-specific area).

Hereinafter, the third embodiment will be described, focusing on the difference from the first and second embodiments.

<Functional Configuration of the Specific Area Output Unit in the User Terminal, and Specific Example of the Specific Area Output Process>

Figure 22:
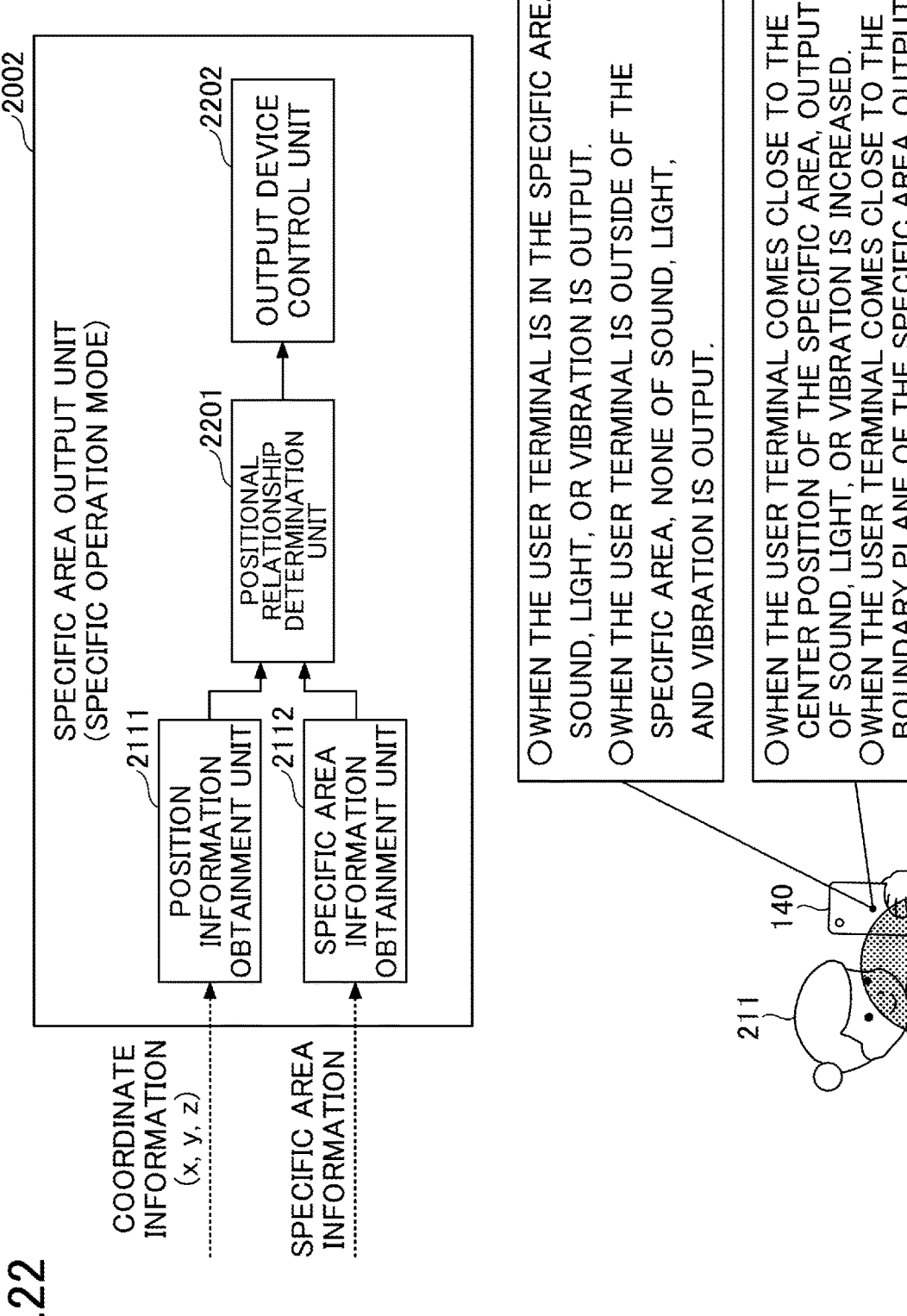
FIG. 22 is a second view illustrating the functional configuration of the specific area output unit and a specific example of the specific area output process.

First, details of the functional configuration of the specific area output unit 2002 in the user terminal 140 (here, a functional configuration in relation to the specific area output process) and a specific example of the specific area output process will be described. FIG. 22 is a second view illustrating the functional configuration of the specific area output unit and a specific example of the specific area output process.

As illustrated in FIG. 22, the specific area output unit 2002 includes the position information obtainment unit 2111, the specific area information obtainment unit 2112, a positional relationship determination unit 2201, and an output device control unit 2202.

The position information obtainment unit 2111 has similar functions to those of the position information obtainment unit 2111 described with reference to FIG. 21. That is, the position information obtainment unit 2111 obtains the coordinate information (x,y, z) transmitted from the position information transmission unit 2104, and notifies the positional relationship determination unit 2201 of the obtained coordinate information.

The specific area information obtainment unit 2112 has similar functions to those of the specific area information obtainment unit 2112 described with reference to FIG. 21. That is, the specific area information obtainment unit 2112 obtains the specific area information transmitted from the specific area transmission unit 2106, and notifies the positional relationship determination unit 2201 of the obtained specific area information.

The positional relationship determination unit 2201 identifies the current position of the user terminal 140 in the real space based on the coordinate information (x,y, z) notified from the position information obtainment unit 2111. Also, the positional relationship determination unit 2201 determines a positional relationship between the specific area and the user terminal 140 based on the specific area information notified from the specific area information obtainment unit 2112. Furthermore, the positional relationship determination unit 2201 notifies the output device control unit 2202 of the determined positional relationship.

The output device control unit 2202 controls the output device (the display device 326, the voice output device 330, or the vibration device 331) based on the positional relationship notified from the positional relationship determination unit 2201, thereby outputting light, sound, or vibration for making a notification to the user. Thereby, the user can know the positional relationship between the specific area and the user terminal 140. Note that, the output device control unit 2202 may control the display device 326 so as to output light, or may control an unillustrated LED so as to output light.

The example of FIG. 22 illustrates a situation in which the user 211 holds the user terminal 140 at a position identified by the coordinate information (x,y, z). Also, the example of FIG. 22 illustrates a situation in which the specific area 621 is registered.

Under such circumstances, for example, the output device control unit 2202 performs control so as to output light, sound, or vibration when the user terminal 140 is positioned in the specific area 621, or so as not to output light, sound, or vibration when the user terminal 140 is positioned outside of the specific area 621.

Alternatively, for example, the output device control unit 2202 may control output so that the amplitude of vibration, the volume of sound, the contents of an image, and the color or quantity of light become different between when the user terminal 140 is positioned in the specific area 621 and when the user terminal 140 is positioned outside of the specific area 621.

Alternatively, for example, the output device control unit 2202 may perform control so as to switch the stimulus; e.g., so as to output light when the user terminal 140 is positioned in the specific area 621 and so as to output sound or vibration when the user terminal 140 is positioned outside of the specific area 621.

In any case, the output device control unit 2202 controls output when the area corresponding to the coordinate information (x,y, z) has changed from the inside of the specific area 621 to the outside of the specific area 621 (in the non-specific area) in response to the movement operation performed on the user terminal 140. Alternatively, the output device control unit 2202 controls output when the area corresponding to the coordinate information (x,y, z) has changed from the outside of the specific area 621 (in the non-specific area) to the inside of the specific area 621 in response to the movement operation of the user terminal 140 being performed.

Also, for example, the output device control unit 2202 may perform control so as to increase the output of sound, light, or vibration when the user terminal 140 in the specific area 621 has come close to the center position of the specific area 621. Also, for example, the output device control unit 2202 may perform control so as to decrease the output of sound, light, or vibration when the user terminal 140 in the specific area 621 has come close to the boundary plane of the specific area 621.

Also, for example, the output device control unit 2202 may control the output in accordance with the corresponding operation information when light, sound, or vibration is output in response to the user terminal 140 being positioned in the specific area 621. In this case, for example, different operation information is registered for each of the plurality of specific areas, and when the user terminal 140 has moved across the plurality of specific areas, the amplitude of vibration, the volume of sound, the contents of an image, and the color or quantity of light change.

Note that, when different operation information is registered for each of the positions in a single specific area, the amplitude of vibration, the volume of sound, the contents of an image, and the color or quantity of light change while the user terminal 140 is moving in the single specific area.

In this way, in order for the user to know the registered specific area, by controlling the output using the output function of the user terminal 140, the user 211 can know the following via the user terminal 140:

which area in the real space is registered as the specific area, and what operation information is registered.

SUMMARY

As is clear from the above description, the air conditioning system 100 according to the third embodiment includes, in addition to the functions described in the first embodiment, the function of controlling the output in accordance with the movement operation of the user terminal.

Thereby, according to the third embodiment, it is possible to obtain similar effects to those of the first embodiment, and the user can know the registered specific area via the user terminal 140.

Fourth Embodiment

In the first embodiment, for calculating the coordinate information indicating the position of the user terminal 140 in the real space, the following are used:
    the radio wave information (reflection signals of the laser light) obtained by the radio wave transceiver device 310 (one example of the three-dimensional position measurement sensor), and
    the photographed image (RGB image) photographed by the photographing device 120.
However, the method of calculating the coordinate information indicating the position of the user terminal 140 in the real space is not limited thereto. For example, the three-dimensional position measurement sensor is composed of a plurality of photographing devices 120 attached at different positions in the real space 210 or 220, and the coordinate information indicating the position of the user terminal 140 in the real space may be calculated by matching
    a photographed image photographed by the first photographing device 120,
    a photographed image photographed by the second photographing device 120,
    a photographed image photographed by the $\alpha^{th}$ photographing device 120.
Alternatively, the coordinate information indicating the position of the user terminal 140 in the real space may be calculated using a SLAM (Simultaneous Localization and Mapping) technique. Specifically, the three-dimensional position measurement sensor is composed of the photographing device 120 attached via an arm to the interior of the real space 210 or 220 and also a sensor configured to emit high-luminous light receivable by the photographing device 120 is attached to the user terminal 140, and the coordinate information indicating the position of the user terminal 140 in the real space may be calculated by collating
    three-dimensional space data obtained from the photographed image photographed by the photographing device 120 that is swinging, with
    relative position data between the user terminal 140 and the photographing device 120, obtained by the photographing device 120 receiving the high-luminous light emitted from the user terminal 140.
Also, in the first embodiment and the present embodiment, the coordinate information indicating the position of the user terminal 140 in the real space is calculated by the device other than the user terminal 140 (the control device of the air conditioning device) using the data obtained by the device other than the user terminal 140.

However, the coordinate information indicating the position of the user terminal 140 in the real space may be calculated by the user terminal 140 using the data obtained by the user terminal 140. Specifically, the user terminal 140 is provided with an API (Application Programming Interface) capable of generating a depth map based on the photographed image photographed by the photographing device 327 of the user terminal 140, and the coordinate information indicating the position of the user terminal 140 in the real space may be calculated by collating
    the depth map generated using the API from the photographed image photographed by the photographing device 327, with
    layout information (shape data such as three-dimensional data) in the real space 210 or 220.
FIG. 23 is a view illustrating a calculation example of the coordinate information indicating the position of the user terminal in the real space. The calculation example of FIG.

23 illustrates a situation in which during the movement operation of the user terminal 140, the user terminal 140 is always photographing the interior of the real space 210 or 220.

In FIG. 23, a photographed image 2301 and a photographed image 2302 illustrate photographed images that are photographed at different points in time. As illustrated in FIG. 23, by using the photographed image 2301 and the photographed image 2302 that are photographed at different positions, the user terminal 140 can calculate, based on epipolar geometry, depth distances $l_1$ and $l_2$ from feature point X of an object disposed in the real space 210 or 220.

Here, if coordinate information (a,b,c) of an object 2303 is previously obtained as the layout information of the object, the user terminal 140 can calculate the current coordinate information (x,y, z) of the user terminal 140 based on the coordinate information (a,b,c) of the object and the calculated depth distances $l_1$ and $l_2$.

In this way, the configuration, number, and disposition of the sensor for calculating the coordinate information indicating the position of the user terminal 140 in the real space may be a given configuration, number, and disposition. A combination thereof suitable for the environment of the real space is selected.

Fifth Embodiment

In the first embodiment, mainly, the predetermined area in the real space (the area not including the target) is registered as the specific area. Alternatively, in the first embodiment, when the area including the target is registered as the specific area, the coordinate information of the object's area including the target is previously stored.

Meanwhile, in the fifth embodiment, the area including the target, person, or parts thereof in the real space is registered as the specific area. Also, in the fifth embodiment, when the area including the target (or parts thereof) is registered as the specific area, the coordinate information of the object's area of the target is not previously stored, and is calculated each time.

<Functional Configuration of the User Terminal>

Figure 24:
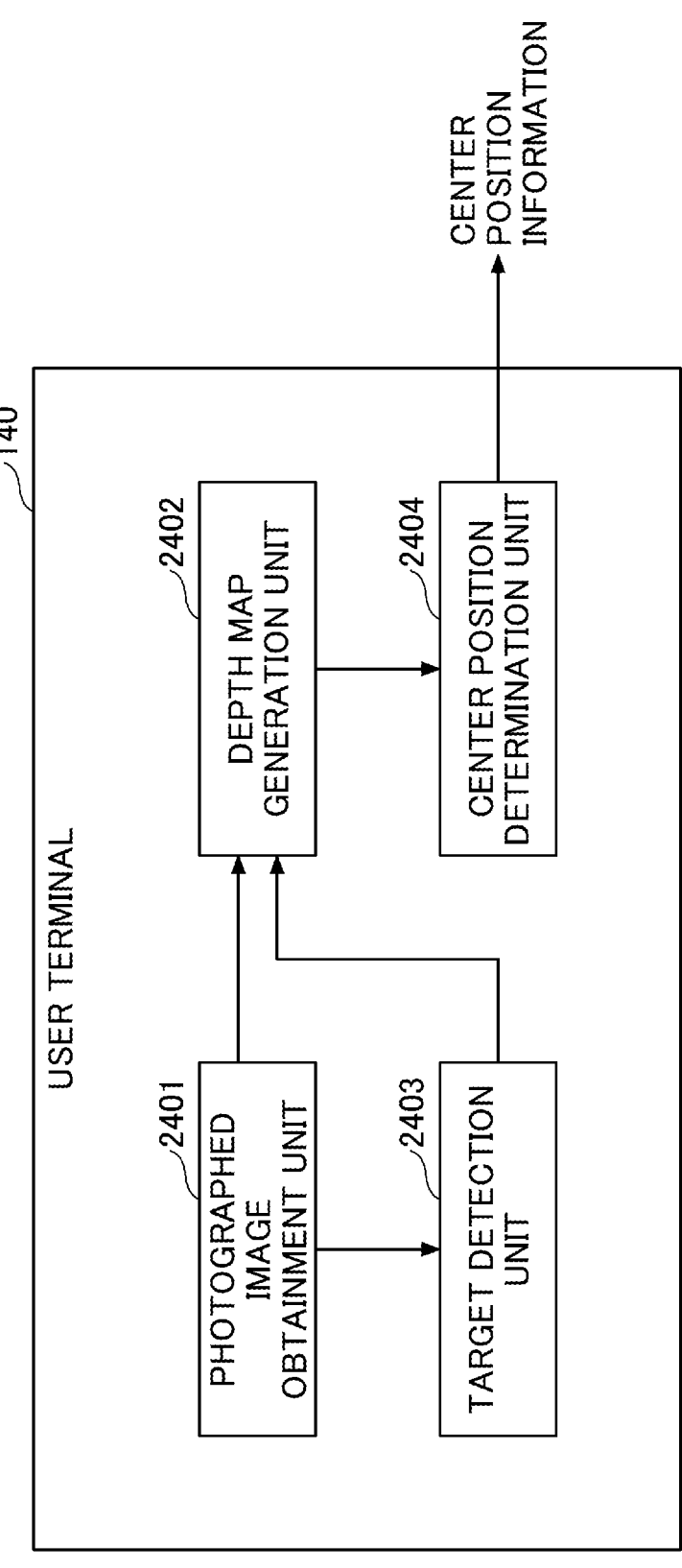
FIG. 24 is a view illustrating one example of the functional configuration of the user terminal.

First, details of the functional configuration of the user terminal 140 according to the fifth embodiment (here, a functional configuration in relation to a reference position calculation process) will be described. FIG. 24 is a view illustrating one example of the functional configuration of the user terminal.

In the fifth embodiment, the user terminal 140 executes the air conditioning operation program, and thereby functions as a photographed image obtainment unit 2401, a depth map generation unit 2402, a target detection unit 2403, and a center position determination unit 2404.

The photographed image obtainment unit 2401 obtains the photographed image photographed by the photographing device 327, and notifies the depth map generation unit 2402 and the target detection unit 2403 of the obtained photographed image.

The target detection unit 2403 detects the targets included in the photographed image obtained by the photographed image obtainment unit 2401 and, from among the detected targets, extracts the target of a kind designated by the user, and notifies the depth map generation unit 2402 of the extracted target.

The depth map generation unit 2402 is an API that generates a depth map based on the photographed image. The depth map generation unit 2402 generates a depth map in the real space 210 or 220 based on the photographed image notified from the photographed image obtainment unit 2401.

Also, the depth map generation unit 1422 identifies, in the generated depth map, an area corresponding to the target notified from the target detection unit 2403, and notifies the center position determination unit 2404 of the identified area.

The center position determination unit 2404 calculates the center position information of the target notified from the target detection unit 2403, based on the depth map of the area identified by the depth map generation unit 2402.

Also, the center position determination unit 2404 transmits the calculated center position information to the control device of the air conditioning device 110.

<Functional Configuration of the Specific Area Input Unit>

Figure 25:
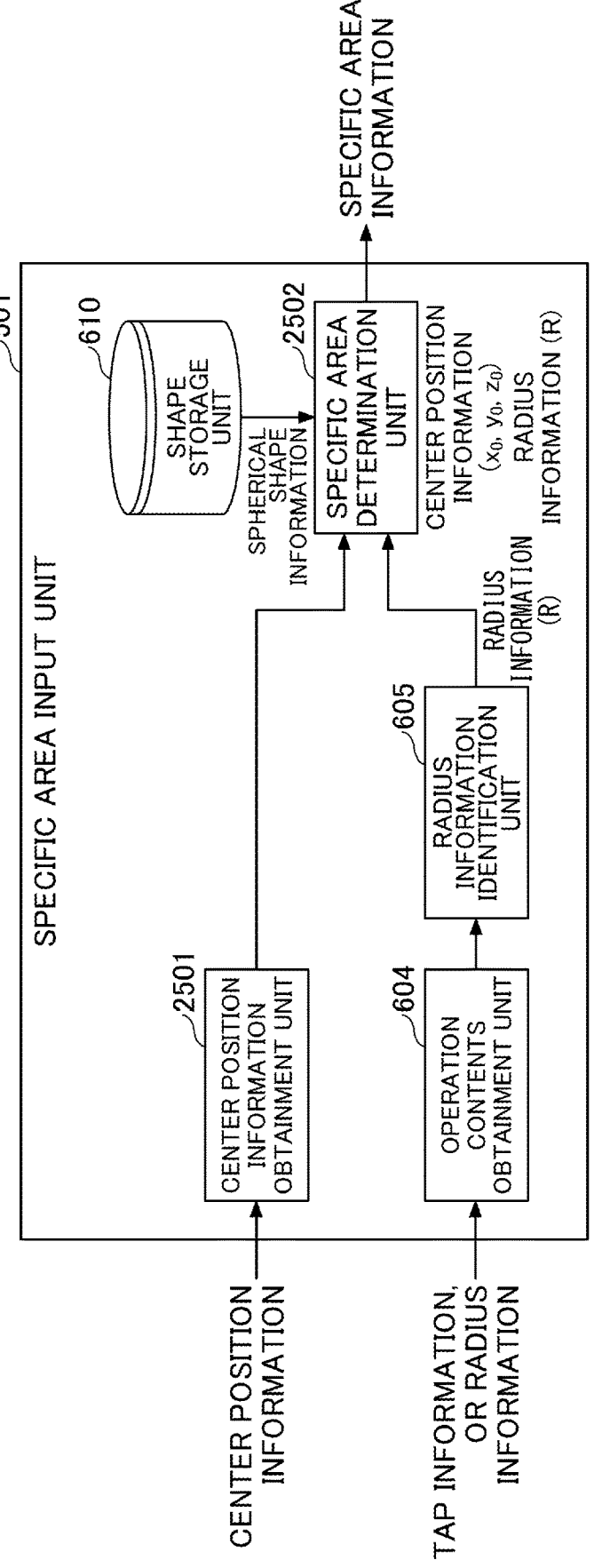
FIG. 25 is a view illustrating one example of the functional configuration of the specific area input unit.

Next, the functional configuration of the specific area input unit 501 realized by the registration program being executed (here, a functional configuration in relation to determination of the specific area) in the control device of the air conditioning device 110 according to the fifth embodiment will be described. FIG. 25 is a view illustrating one example of the functional configuration of the specific area input unit. In the case of FIG. 25, the differences from the specific area input unit as illustrated in FIG. 6 are: the presence of a center position information obtainment unit 2501; and the function of a specific area determination unit 2502 being different from the function of the specific area determination unit 607 of FIG. 6.

The center position information obtainment unit 2501 obtains the center position information from the user terminal 140, and notifies the specific area determination unit 2502 of the obtained center position information.

The specific area determination unit 2502 refers to the shape storage unit 610, and obtains shape information of a predetermined shape of the specific area (e.g., spherical shape information). Also, the specific area determination unit 607 determines the specific area information based on: the center position information notified from the center position information obtainment unit 2501; the radius information (R) notified from the radius information identification unit 605; and the spherical shape information obtained from the shape storage unit 610.

Specific Example of the Center Position
Determination Process

Next, a specific example of the center position determination process by the user terminal 140 will be described with reference to patterns (1) to (4).

(1) Pattern 1

Figure 26:
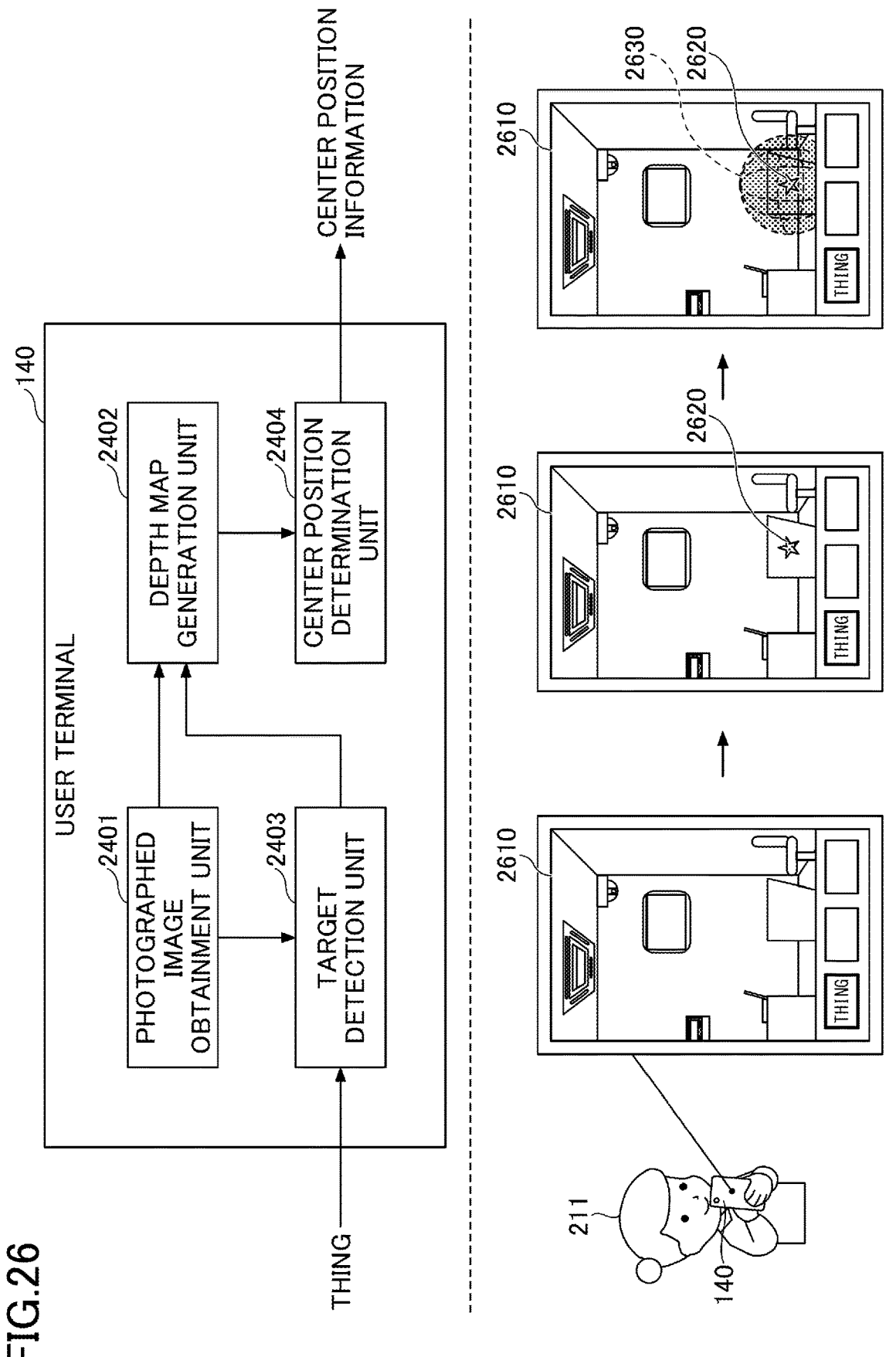
FIG. 26 is a first representation illustrating a specific example of a center position determination process.

FIG. 26 is a first representation illustrating a specific example of the center position determination process. As illustrated in FIG. 26, when the photographing device 327 of the user terminal 140 photographs the real space 220, the photographed image obtainment unit 2401 displays a photographed image 2610 on the display screen, and the target detection unit 2403 detects a plurality of objects included in the photographed image 2610. Furthermore, the depth map generation unit 2402 generates a depth map based on the photographed image 2610.

In response to the photographed image 2610 being displayed, the user 211 performs an instruction operation about the kind of the target to be detected. The example of FIG. 26 illustrates a situation in which the user 211 has designated "thing" as the kind of the target to be detected.

When "thing" has been designated as the kind of the target to be detected, the target detection unit 2403 identifies, among the detected plurality of objects, the closest object to the user terminal 140 as the target, and notifies the depth map generation unit 2402 of the identified target. Note that, the example of FIG. 26 illustrates a situation in which "desk", the closest to the user terminal 140, has been identified as the target.

Once the target has been identified, the depth map generation unit 2402 identifies an area of the identified target from the generated depth map, and notifies the center position determination unit 2404 of the identified area.

The center position determination unit 2404 calculates the center position information of the target based on the depth map of the notified area of the target. In FIG. 26, reference numeral 2620 indicates the center position information calculated by the center position determination unit 2404.

Note that, the center position information indicated by reference numeral 2620 is input to the specific area input unit 501, and the peripheral area based on a reference that is the center position information is determined as a specific area 2630.

(2) Pattern 2

Figure 27:
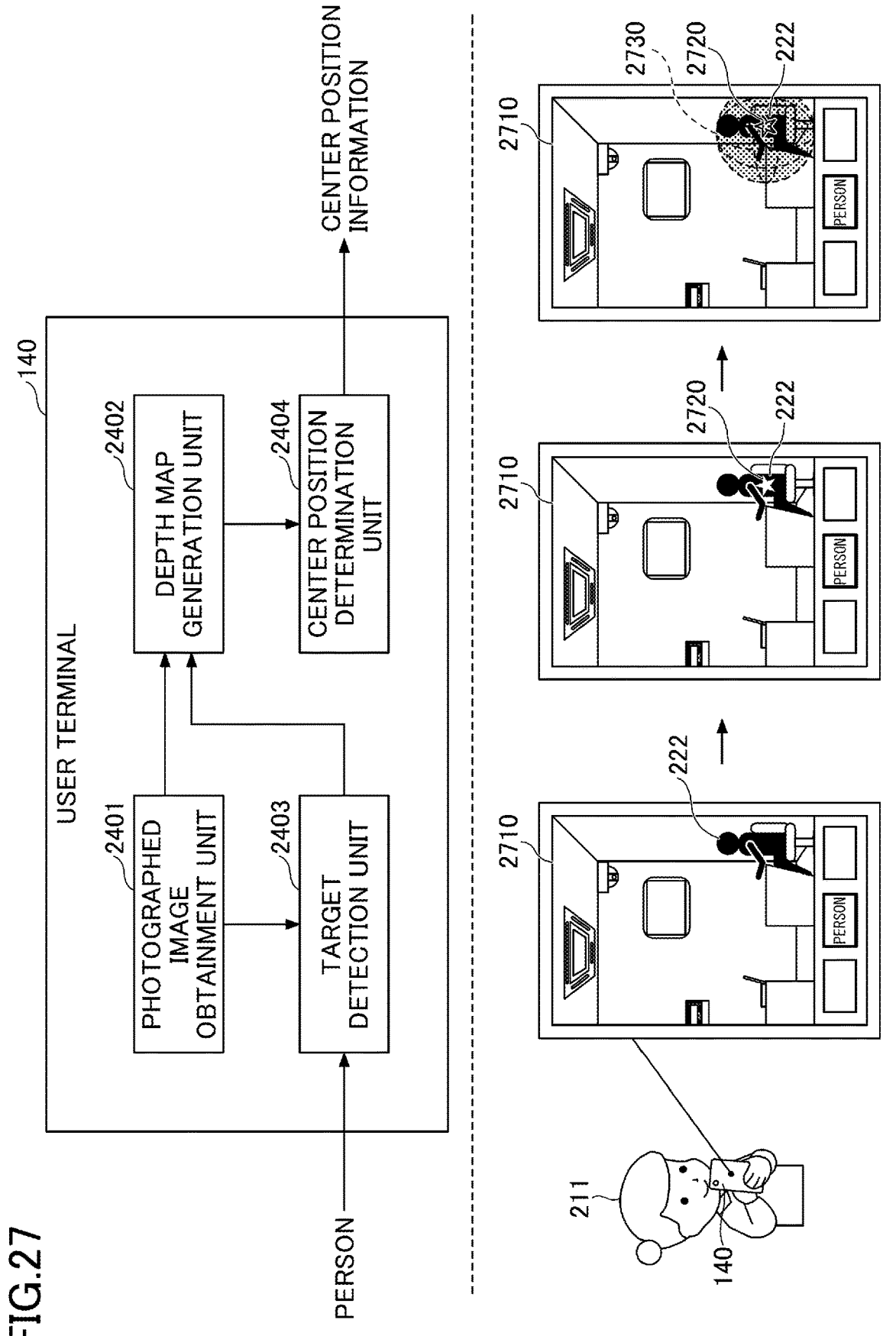
FIG. 27 is a second representation illustrating a specific example of the center position determination process.

FIG. 27 is a second representation illustrating a specific example of the center position determination process. As illustrated in FIG. 27, the photographing device 327 of the user terminal 140 photographs the real space 220, and thereby the photographed image obtainment unit 2401 displays a photographed image 2710 on the display screen and the target detection unit 2403 detects a plurality of objects included in the photographed image 2710. Furthermore, the depth map generation unit 2402 generates a depth map based on the photographed image 2710.

In response to the photographed image 2710 being displayed, the user 211 performs an instruction operation about the kind of the target to be detected. The example of FIG. 27 illustrates a situation in which the user 211 has designated "person" as the kind of the target to be detected.

When "person" has been designated as the kind of the target to be detected, the target detection unit 2403 identifies, among the detected plurality of objects, the closest person to the user terminal 140 as the target, and notifies the depth map generation unit 2402 of the identified target. Note that, the example of FIG. 27 illustrates a situation in which the user 222, the closest to the user terminal 140, has been identified as the target.

Once the target has been identified, the depth map generation unit 2402 identifies an area of the identified target from the generated depth map, and notifies the center position determination unit 2404 of the identified area.

The center position determination unit 2404 calculates the center position information of the target based on the depth map of the notified area of the target. In FIG. 27, reference numeral 2720 indicates the center position information calculated by the center position determination unit 2404.

Note that, the center position information indicated by reference numeral 2720 is input to the specific area input unit 501, and the peripheral area based on a reference that is the center position information is determined as a specific area 2730.

(3) Pattern 3

Figure 28:
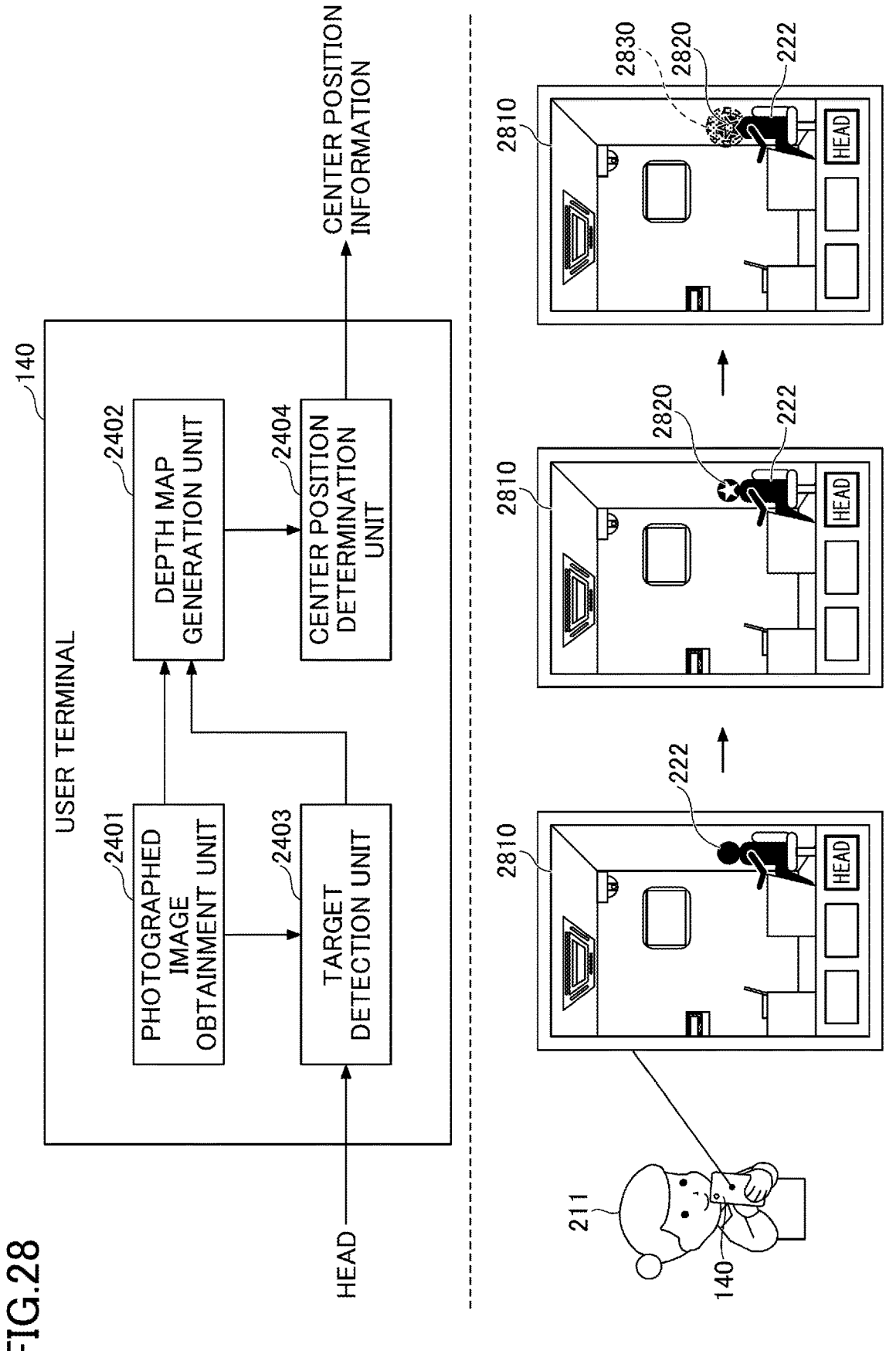
FIG. 28 is a third representation illustrating a specific example of the center position determination process.

FIG. 28 is a third representation illustrating a specific example of the center position determination process. As illustrated in FIG. 28, the photographing device 327 of the user terminal 140 photographs the real space 220, and thereby the photographed image obtainment unit 2401 displays a photographed image 2810 on the display screen and the target detection unit 2403 detects a plurality of objects included in the photographed image 2810. Furthermore, the depth map generation unit 2402 generates a depth map based on the photographed image 2810.

In response to the photographed image 2810 being displayed, the user 211 performs a selective instruction operation about the part of the target to be detected. The example of FIG. 28 illustrates a situation in which the user 211 has selectively designated "head" of "person" as the part of the target to be detected.

Once "head" of "person" has been selectively designated as the part of the target to be detected, the target detection unit 2403 identifies, among the detected plurality of objects, the closest person's head to the user terminal 140 as the target, and notifies the depth map generation unit 2402 of the identified target. The example of FIG. 28 illustrates a situation in which the user 222's head, the closest to the user terminal 140, has been identified as the target.

Once the target has been identified, the depth map generation unit 2402 identifies an area of the identified target from the generated depth map, and notifies the center position determination unit 2404 of the identified area.

The center position determination unit 2404 calculates the center position information of the target based on the depth map of the notified area of the target. In FIG. 28, reference numeral 2820 indicates the center position information calculated by the center position determination unit 2404.

Note that, the center position information indicated by reference numeral 2820 is input to the specific area input unit 501, and the peripheral area based on a reference that is the center position information is determined as a specific area 2830.

(4) Pattern 4

Figure 29:
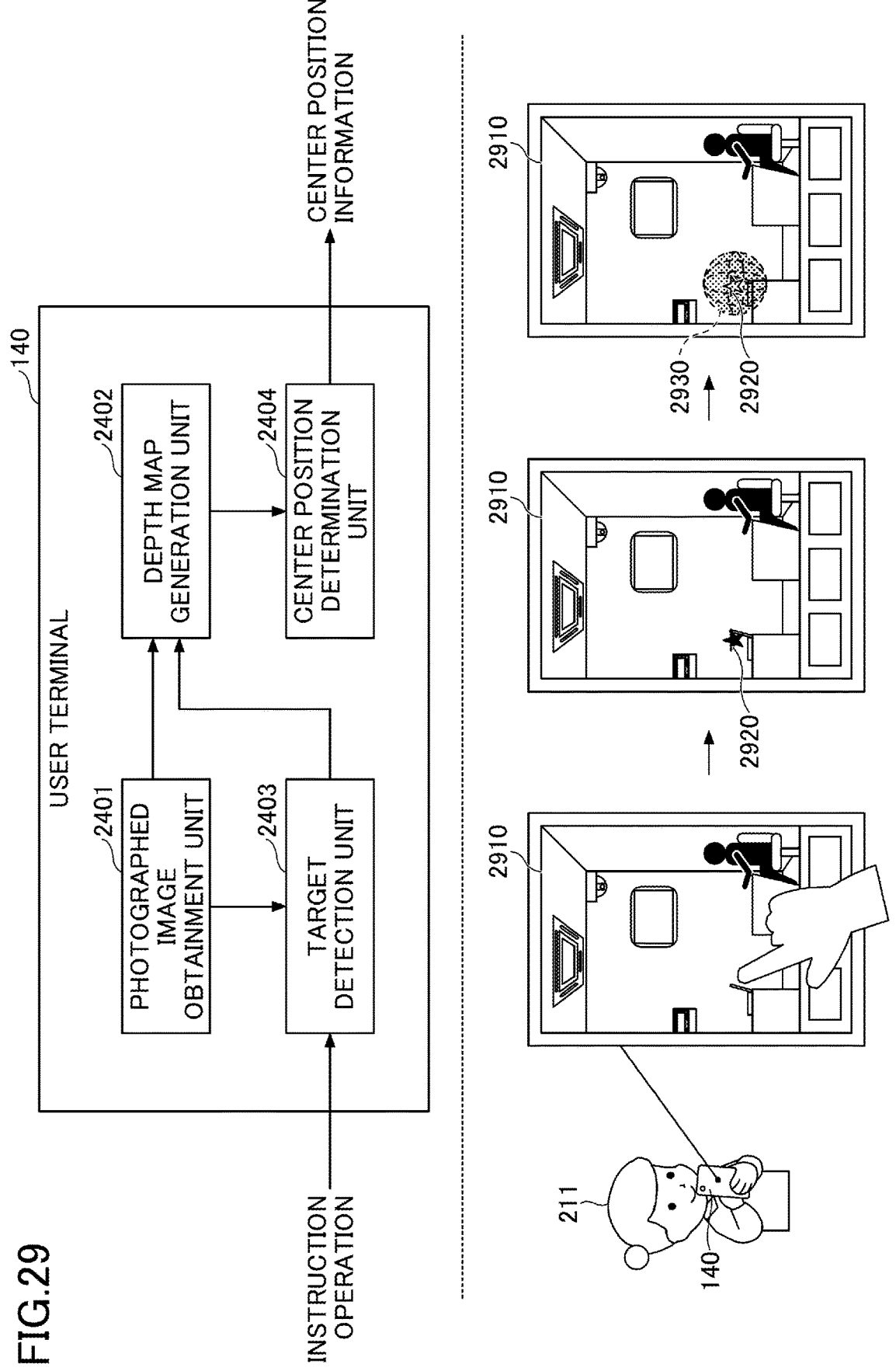
FIG. 29 is a fourth representation illustrating a specific example of the center position determination process.

FIG. 29 is a fourth representation illustrating a specific example of the center position determination process. As illustrated in FIG. 29, the photographing device 327 of the user terminal 140 photographs the real space 220, and thereby the photographed image obtainment unit 2401 displays a photographed image 2910 on the display screen and the target detection unit 2403 detects a plurality of objects included in the photographed image 2810. Furthermore, the depth map generation unit 2402 generates a depth map based on the photographed image 2910.

In response to the photographed image 2910 being displayed, the user 211 performs an instruction operation about the target to be detected. Note that, the display screen on which the photographed image 2910 is to be displayed is capable of being pointed to. The example of FIG. 29 illustrates a situation in which in response to the position of "laptop PC" on the display screen being pointed to by the user 211, the instruction operation about the target to be detected has been received.

Once "laptop PC" has been pointed to as the target to be detected, the target detection unit 2403 identifies, among the detected plurality of objects, the "laptop PC" pointed to as the target, and notifies the depth map generation unit 2402 of the identified target.

Once the target has been identified, the depth map generation unit 2402 identifies an area of the identified target from the generated depth map, and notifies the center position determination unit 2404 of the identified area.

The center position determination unit 2404 calculates the center position information of the target based on the depth map of the notified area of the target. In FIG. 29, reference numeral 2920 indicates the center position information calculated by the center position determination unit 2404.

Note that, the center position information indicated by reference numeral 2920 is input to the specific area input unit 501, and the peripheral area based on a reference that is the center position information is determined as a specific area 2930.

SUMMARY

As is clear from the above description, the air conditioning system 100 according to the fifth embodiment is such that the user terminal is capable of receiving an instruction operation of the target, and the peripheral area based on a reference that is the center position information of the target in the real space, which has been received by the user terminal, is determined as the specific area, the user terminal is capable of receiving a selective instruction operation of the part of the target, and the peripheral area based on a reference that is the center position information of the part of the target in the real space, which has been received by the user terminal, is determined as the specific area, and the display screen, on which the photographed image photographed by the photographing device of the user terminal is to be displayed, is capable of being pointed to, and the user terminal identifies, as the target, the object at a position pointed to among the plurality of objects included in the photographed image.

Thereby, according to the fifth embodiment, it becomes possible to register the target-including area as the specific area, and also becomes possible to identify the target via the photographed image displayed on the user terminal.

Other Embodiments

In the above embodiments, the temperature, the airflow direction, and the airflow volume are set as the operation information associated with the specific area; however, registration items that can be registered as the operation information associated with the specific area are not limited thereto.

Also, in the above embodiments, the specific area input unit 501 is realized in the control device in the air conditioning device 110; however, the specific area input unit 501 may be realized in a device other than the control device in the air conditioning device 110. Alternatively, the specific area input unit 501 may be realized in a device outside of the air conditioning device 110 (in a given device in the air conditioning system 100).

Likewise, in the above embodiments, the specific area output unit 503 is realized in the control device in the air conditioning device 110 or in the user terminal 140; however, the specific area output unit 503 may be realized in a device other than the control device in the air conditioning device 110. Alternatively, the specific area output unit 503 may be realized in a device other than the air conditioning device 110 and the user terminal 140 (in a given device in the air conditioning system 100).

Also, in the above embodiments, the air conditioning system 100 includes the air conditioning device 110, the photographing device 120, the display device 130, and the user terminal 140; however, the configuration of the air conditioning system 100 is not limited thereto, and for example, a server device that controls a plurality of air conditioning devices 110 may be included. Alternatively, when such a server device is included, the specific area input unit 501 and the specific area output unit 503 may be realized in the server device.

Also, in the above embodiments, the size of the specific area is determined by a predetermined setting operation; however, the shape of the specific area may be determined by a predetermined setting operation.

Also, in the first embodiment, tapping operations performed "n" times and a pressing-down operation lasting for a predetermined period of time are exemplified as the setting operation for determining the size of the specific area; however, the setting operation for determining the size of the specific area is not limited thereto. For example, the size of the specific area may be determined based on the coordinate information of the user terminal 140 at the time the setting operation of a start point has been performed on the user terminal 140 and based on the coordinate information of the user terminal 140 at the time the setting operation of an end point has been performed on the user terminal 140.

Alternatively, when the peripheral area based on a reference that is the center position information has been determined as the specific area, the size of the specific area may be determined based on: the coordinate information of the user terminal at the time the setting operation of an end point has been performed; and the center position information.

Also, in the second embodiment, the specific area image (three-dimensional image) is superimposed on the photographed image photographed by the photographing device 327 of the user terminal 140; however, what the specific area image is to be superimposed on is not limited to the photographed image. For example, the specific area image may be superimposed on an image (still image) of the real space 210 or 220 with which layout information in the real space 210 or 220 has been associated. This is because if the coordinate information in the real space 210 or 220 has been associated with respective positions of the still image, the specific area image can be appropriately superimposed on the image.

Also, in the third embodiment, variation in the notification method of notifying the user of a predetermined stimulus (sound, light, or vibration) by the output device control unit 2202 has been described; however, the variation in the notification method for the user is not limited thereto.

For example, as in the fifth embodiment, when it is possible to receive an instruction operation about the target, a different stimulus may be notified in accordance with whether the specific area has been determined by the center position information of the target in the real space.
Specifically, the stimulus to be given when the user terminal 140 is positioned in the specific area may become different between when the area not including the target has been determined as the specific area and when the area including the target has been determined as the specific area.

Also, as in the fifth embodiment, when it is possible to receive an instruction operation of "person" as the target, a different stimulus may be notified in accordance with whether the target is a person. Specifically, when the target-including area has been determined as the specific area, the stimulus to be given when the user terminal 140 is positioned in the specific area may become different between when the target is a person and when the target is an object other than a person.

Also, in the above embodiments, the smart phone 141, the remote controller 142, the wearable device, or the like has been exemplified as the user terminal 140; however, the user terminal 140 may not be an electronic device. For example, as in Pattern 3 to Pattern 5 described in the first embodiment, when the specific area is determined by the movement operation of the user terminal 140, a casing having no built-in electronic device may be used. In this case, the shape of the casing may be a given shape and may be, for example, a rod-like member.

Also, in the above embodiments, although a system of interest has been realized in the air conditioning system, the system of interest is not limited to the air conditioning system and may be another system as long as it is a registration system in which the specific area is determined in the real space and the determined specific area is registered. In other words, the air conditioning system described in the above embodiments is one applied example of the registration system.

Although the embodiments have been described above, it should be understood that various changes to the forms and details would be possible without deviating from the gist and scope of the claims as recited.

The present application claims priority to Japanese Patent Application No. 2021-059231, filed Mar. 31, 2021, the contents of which are incorporated herein by reference in their entirety.

REFERENCE SIGNS LIST

100: air conditioning system
110: air conditioning device
120: photographing device
130: display device
140: user terminal
210,220: real space
326: display device
327: photographing device
330: voice output device
331: vibration device
400: operation screen
501: specific area input unit
503: specific area output unit
601: photographed image obtainment unit
602: radio wave information obtainment unit
603: position information obtainment unit
604: operation contents obtainment unit
605: radius information identification unit
607: specific area determination unit
701: operation contents obtainment unit
801: operation contents obtainment unit
802: center position and radius information calculation unit
803: specific area determination unit
902: specific area determination unit
1001: projection direction determination unit
1002: specific area determination unit
1101: operation contents obtainment unit
1102: target area calculation unit
1103: specific area determination unit
1111: operation contents obtainment unit
1112: reference position calculation unit
1113: target area calculation unit
1114: specific area determination unit
1201: operation contents obtainment unit
1202: deletion target determination unit
1203: specific area deletion unit
1301: operation contents obtainment unit
1302: moving target determination unit
1303: specific area update unit
1401: operation contents obtainment unit
1402: operation information obtainment unit

1403: operation information setting unit
1501: operation contents obtainment unit
1502: reverse instruction obtainment unit
1503: operation information update unit
1601: specific area information obtainment unit
1602: photographed image obtainment unit
1603: specific area image generation unit
1611: the photographed image
1612: specific area image
1901,1902: specific area
2001: transmission unit
2002: specific area output unit
2101: photographed image obtainment unit
2102: radio wave information obtainment unit
2103: position information obtainment unit
2104: position information transmission unit
2105: specific area information obtainment unit
2106: specific area transmission unit
2111: position information obtainment unit
2112: specific area information obtainment unit
2113: specific area image generation unit
2114: photographed image obtainment unit
2115: display control unit
2121,2131: the photographed image
2122,2132: display image
2201: positional relationship determination unit
2202: output device control unit
2401: photographed image obtainment unit
2402: depth map generation unit
2403: target detection unit
2404: center position determination unit
2501: center position information obtainment unit
2502 specific area determination unit

The invention claimed is:

1. A registration system, comprising:
a control unit; and
a storage unit, wherein
the control unit is configured to determine a specific
area in a real space based on position information of
a user terminal in the real space and based on
operation contents of the user terminal, the specific
area defined by movement of the user terminal
designating the specific area based on a reference
that is a center position information indicating a
center point of a trajectory space of the user terminal,
the trajectory space created by the movement of the
user terminal using the position information of the
user terminal, and register the specific area in the
storage unit, the specific area being enclosed by a
three-dimensional shape,
wherein
the user terminal is capable of receiving a start instruction
operation for operating a device configured to improve
comfortableness of the real space, and
in response to the start instruction operation received by
the user terminal, the control unit instructs the device
configured to improve the comfortableness of the real
space so as to perform control of improving the com-
fortableness of the real space for the specific area in the
real space registered in the storage unit; or
wherein
the user terminal is capable of receiving an air condition-
ing instruction operation, and
in response to the air conditioning instruction operation
received by the user terminal, the control unit instructs
an air conditioning device attached in the real space so as to perform air conditioning for the specific area in
the real space registered in the storage unit.
2. The registration system according to claim 1, wherein
the control unit determines the specific area in the real
space based on a trajectory of the position information
of the user terminal in response to a movement opera-
tion of the user terminal, and registers the specific area
in the storage unit.
3. The registration system according to claim 1, wherein
the user terminal is capable of receiving an instruction
operation, and
the control unit determines, as the specific area, a periph-
eral area based on a reference that is the position
information of the user terminal in response to the
instruction operation received by the user terminal, and
registers the specific area in the storage unit.
4. The registration system according to claim 1, wherein
the user terminal is capable of receiving an instruction
operation, and
the control unit determines, as the specific area in the real
space, a peripheral area based on a reference that is the
position information in the real space of a target iden-
tified in response to the instruction operation received
by the user terminal, and registers the specific area in
the storage unit.
5. The registration system according to claim 4, wherein
the user terminal is capable of receiving a selective
instruction operation, and
the control unit determines, as the specific area in the real
space, a peripheral area based on a reference that is the
position information, in the real space, of a part of the
target identified in response to the selective instruction
operation received by the user terminal, and registers
the specific area in the storage unit.
6. The registration system according to claim 4, wherein
the user terminal includes
a photographing device, and
a display device configured to display an image pho-
tographed by the photographing device, and
a control unit of the user terminal identifies, as the target,
an object included in the image.
7. The registration system according to claim 4, wherein
the user terminal includes
a photographing device, and
a display device that is configured to display, on a
screen, an image photographed by the photographing
device and that enables pointing of a position on the
screen on which an image is displayed, and
a control unit of the user terminal identifies, as the target,
an object at the position pointed to among a plurality of
objects included in the image photographed by the
photographing device.
8. The registration system according to claim 4, wherein
the user terminal includes an output device, and
in response to the user terminal being positioned in the
specific area in the real space, the output device notifies
a different stimulus in accordance with whether the spe-
cific area is determined by the position information of
the target in the real space, or
a different stimulus in accordance with whether the target
is a person in a case in which the specific area is
determined by the position information of the target in
the real space.
9. The registration system according to claim 1, wherein
the user terminal is capable of receiving a setting opera-
tion, and the control unit determines a size or a shape of the specific area based on the setting operation received by the user terminal.

10. The registration system according to claim 9, wherein the user terminal is capable of receiving the setting operation, and the control unit determines the size of the specific area based on:

the position information of the user terminal with the setting operation of a start point being received by the user terminal or the position information that is a reference based on which the specific area is determined; and the position information of the user terminal with the setting operation of an end point being received by the user terminal.

11. The registration system according to claim 1, wherein the user terminal includes a display device configured to display an image, and a control unit of the user terminal superimposes an image indicating the specific area on an image obtained by photographing the real space, and displays a superimposed image on the display device.

12. The registration system according to claim 11, wherein the user terminal includes a photographing device, and the control unit of the user terminal superimposes a three-dimensional image indicating the specific area on the image photographed by the photographing device, and displays a superimposed image, the three-dimensional image being generated based on the position information and posture information of the user terminal in the real space.

13. The registration system according to claim 1, wherein the user terminal includes an output device, and the output device notifies a stimulus in response to the user terminal being positioned in the specific area in the real space.

14. The registration system according to claim 1, wherein the user terminal includes an output device, and the output device notifies a different stimulus in accordance with a positional relationship between the specific area in the real space and the user terminal.

15. The registration system according to claim 1, wherein the user terminal includes a sensor, and a control unit of the user terminal collates shape data of the real space with data measured by the sensor, thereby calculating the position information of the user terminal in the real space.

16. The registration system according to claim 15, wherein the sensor is a photographing device, and the control unit of the user terminal collates three-dimensional data in the real space with a map generated from a photographed image photographed by the photographing device, thereby calculating the position information of the user terminal in the real space.

17. The registration system according to claim 1, wherein the control unit calculates the position information of the user terminal in the real space based on data measured by a three-dimensional position measurement sensor attached in the real space.

18. The registration system according to claim 17, wherein the three-dimensional position measurement sensor includes a plurality of photographing devices attached at different positions, and the control unit performs matching between photographed images respectively photographed by the plurality of photographing devices, thereby calculating the position information of the user terminal in the real space.

19. The registration system according to claim 1, wherein the control unit collates relative position data between the user terminal and a three-dimensional position measurement sensor attached in the real space, with three-dimensional space data measured by the three-dimensional position measurement sensor attached in the real space, thereby calculating the position information of the user terminal in the real space.

20. The registration system according to claim 1, wherein the control unit instructs a plurality of air conditioning devices attached in the real space so as to perform different air conditioning control between the specific area in the real space registered in the storage unit and a non-specific area other than the specific area.

21. An air conditioning system, comprising:
the registration system according to claim 1.

22. A non-transitory computer-readable recording medium storing a registration program that causes a control unit to execute a process including registering, in a storage unit, a specific area in a real space determined based on position information of a user terminal in the real space and based on operation contents of the user terminal, the specific area being enclosed by a three-dimensional shape, the specific area defined by movement of the user terminal designating the specific area based on a reference that is a center position information indicating a center point of a trajectory space of the user terminal, the trajectory space created by the movement of the user terminal using the position information of the user terminal, wherein the user terminal is capable of receiving a start instruction operation for operating a device configured to improve comfortableness of the real space, and in response to the start instruction operation received by the user terminal, the control unit instructs the device configured to improve the comfortableness of the real space so as to perform control of improving the comfortableness of the real space for the specific area in the real space registered in the storage unit;
or wherein the user terminal is capable of receiving an air conditioning instruction operation, and in response to the air conditioning instruction operation received by the user terminal, the control unit instructs an air conditioning device attached in the real space so as to perform air conditioning for the specific area in the real space registered in the storage unit.

* * * * *